(12) United States Patent
Nishioka et al.

(10) Patent No.: US 10,138,778 B2
(45) Date of Patent: Nov. 27, 2018

(54) EXHAUST PURIFICATION SYSTEM OF INTERNAL COMBUSTION ENGINE

(71) Applicant: Toyota Jidosha Kabushiki Kaisha, Toyota-shi, Aichi-ken (JP)

(72) Inventors: Hiromasa Nishioka, Susono (JP); Kazuhiro Ito, Mishima (JP); Daichi Imai, Shizuoka (JP); Yoshihisa Tsukamoto, Susono (JP); Hiroshi Otsuki, Gotenba (JP); Yasumasa Notake, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 68 days.

(21) Appl. No.: 15/313,805

(22) PCT Filed: May 22, 2015

(86) PCT No.: PCT/JP2015/002598
§ 371 (c)(1),
(2) Date: Nov. 23, 2016

(87) PCT Pub. No.: WO2015/182093
PCT Pub. Date: Dec. 3, 2015

(65) Prior Publication Data
US 2017/0204763 A1    Jul. 20, 2017

(30) Foreign Application Priority Data
May 26, 2014   (JP) ................................ 2014-108028

(51) Int. Cl.
*F01N 3/00* (2006.01)
*F01N 3/035* (2006.01)
(Continued)

(52) U.S. Cl.
CPC ............. *F01N 3/035* (2013.01); *F01N 3/208* (2013.01); *F01N 3/2066* (2013.01); *F01N 9/002* (2013.01);
(Continued)

(58) Field of Classification Search
USPC ......... 60/274, 276, 286, 295, 297, 301, 303, 60/311
See application file for complete search history.

(56) References Cited

U.S. PATENT DOCUMENTS

| 7,500,358 B2 * | 3/2009 | Singh .................... F01N 3/0842 60/276 |
| 7,614,218 B2 * | 11/2009 | Akagawa ........... B01D 53/9431 60/274 |

(Continued)

FOREIGN PATENT DOCUMENTS

| DE | 10 2005 048 117 A1 | 4/2007 |
| JP | 2011-099428 A | 5/2011 |
| JP | 2012-002065 A | 1/2012 |

*Primary Examiner* — Binh Q Tran
(74) *Attorney, Agent, or Firm* — Dinsmore & Shohl LLP

(57) ABSTRACT

An exhaust purification system including a particulate filter, a selective reduction catalyst provided at a downstream side from the filter, an ammonia ingredient feed device which feeds an ammonia ingredient to the selective reduction catalyst, a control device which controls the amount of the ammonia ingredient which is adsorbed at the selective reduction catalyst to become a target adsorption amount, and a filter regeneration system which performs filter regeneration processing to remove PM which has built up on the particulate filter when an execution start condition stands. When removal of PM is demanded, so long as the execution start condition of the filter regeneration processing by the filter regeneration system does not stand, the target adsorption amount is decreased a plurality of times in stages, and the execution start condition of the filter regeneration processing is changed to a different condition at each stage of the target adsorption amount.

12 Claims, 10 Drawing Sheets

(51) Int. Cl.
*F01N 3/20* (2006.01)
*F01N 9/00* (2006.01)
*F01N 13/00* (2010.01)

(52) U.S. Cl.
CPC ........ *F01N 13/009* (2014.06); *F01N 2570/18* (2013.01); *F01N 2610/02* (2013.01); *F01N 2900/08* (2013.01); *F01N 2900/1616* (2013.01); *Y02T 10/24* (2013.01); *Y02T 10/47* (2013.01)

(56) References Cited

U.S. PATENT DOCUMENTS

| | | | | |
|---|---|---|---|---|
| 8,336,525 | B2* | 12/2012 | Runde | F02D 41/1465 |
| | | | | 123/479 |
| 9,593,614 | B2* | 3/2017 | Osumi | F01N 3/035 |
| 2008/0216467 | A1 | 9/2008 | Bruck | |
| 2009/0165442 | A1* | 7/2009 | Hara | B01D 53/9409 |
| | | | | 60/286 |
| 2011/0107742 | A1* | 5/2011 | Igarashi | F01N 3/208 |
| | | | | 60/277 |

* cited by examiner

EXHAUST PURIFICATION SYSTEM OF INTERNAL COMBUSTION ENGINE

CROSS-REFERENCE TO RELATED APPLICATIONS

This application is a U.S. national stage of PCT/JP2015/002598 filed May 22, 2015 which claims priority to JP 2014-108025 filed May 26, 2014, the entire contents of which are hereby incorporated by reference.

TECHNICAL FIELD

The present disclosure relates to an exhaust purification system of an internal combustion engine.

BACKGROUND ART

In the past, there has been known an exhaust purification system of an internal combustion engine which is provided, in the exhaust passage, with a particulate filter which traps particulate matter (below, referred to as "PM") in exhaust gas and a selective reduction catalyst which reduces and purifies $NO_X$ in the exhaust gas by reduction. In such an exhaust purification system, the selective reduction catalyst is provided with an ammonia feed device which feeds urea or ammonia or another ammonia ingredient. In addition, by adjusting the amount of feed of ammonia from the ammonia feed device, the amount of adsorption of the ammonia ingredient at the selective reduction catalyst is maintained at a suitable level. Due to this, the $NO_X$ which is contained in the exhaust gas can be reliably removed by the selective reduction catalyst.

In the meantime, PM gradually builds up at the particulate filter along with use of the internal combustion engine. Further, if the amount of buildup of PM becomes greater, the particulate filter will become clogged and the exhaust resistance due to the particulate filter will become greater. For this reason, in an internal combustion engine provided with a particulate filter, when the amount of buildup of PM at the particulate filter becomes a certain extent or more, a filter regeneration processing is performed in which the particulate filter is raised in temperature to remove the PM which has built up at the particulate filter. In an internal combustion engine which is also provided with the above explained selective reduction catalyst in the engine exhaust passage, this filter regeneration processing leads to a rise in temperature of the selective reduction catalyst as well.

However, if the selective reduction catalyst becomes high in temperature, it will no longer be able to adsorb ammonia and accordingly exhaust gas containing ammonia will leak out from the selective reduction catalyst in the phenomenon called "ammonia slip". If performing the above explained filter regeneration processing, the selective reduction catalyst is raised in temperature, and therefore ammonia slip can occur in this case as well.

Therefore, when performing the filter regeneration processing, it has been proposed to stop the feed of ammonia from the ammonia feed device and to start the filter regeneration processing when the amount of adsorption of ammonia by the selective reduction catalyst becomes a certain value or less (for example, PTL 1). By starting the filter regeneration processing after the amount of adsorption of ammonia by the selective reduction catalyst is decreased in this way, even if the filter regeneration processing leads to a rise in the temperature of the selective reduction catalyst, it is considered possible to suppress the outflow of an ammonia ingredient from the selective reduction catalyst.

CITATION LIST

Patent Literature

[PTL 1]
Japanese Patent Publication No. 2012-2065 A
[PTL 2]
Japanese Patent Publication No. 2011-99428 A

SUMMARY

Technical Problem

In the above-mentioned PTL 1, the filter regeneration processing is performed during normal operation of an internal combustion engine. On the other hand, according to the inventors of the present application, it was learned that if performing the filter regeneration processing during idling operation of an internal combustion engine or while the engine is stopped, compared with when performing the filter regeneration processing during normal operation (that is, when not during idling operation or while the engine is stopped), the amount of energy required for regeneration of the particulate filter is smaller. That is, if performing the filter regeneration processing during normal operation of an internal combustion engine, a large amount of exhaust gas passes through the particulate filter during the regeneration processing, and therefore the energy required for maintaining the particulate filter at a high temperature becomes greater. On the other hand, if performing the filter regeneration processing during idling operation of an internal combustion engine or while the engine is stopped, the flow rate of the exhaust gas passing through the particulate filter during the regeneration processing is small, and therefore the energy required for maintaining the particulate filter at a high temperature becomes smaller.

Further, if performing the filter regeneration processing during normal operation, along with this, the temperature of the selective reduction catalyst rapidly rises. For this reason, when performing the filter regeneration processing, it becomes necessary to sufficiently lower the amount of adsorption of ammonia at the selective reduction catalyst. Similarly, even when performing the filter regeneration processing during idling operation or while the engine is stopped, the temperature of the selective reduction catalyst rises, and therefore it becomes necessary to decrease the amount of adsorption of ammonia at the selective reduction catalyst before the filter regeneration processing. However, even if performing the filter regeneration processing during idling operation or while the engine is stopped, the temperature of the selective reduction catalyst will not rise that rapidly. For this reason, when performing the filter regeneration processing, it is not necessary to lower the amount of adsorption of ammonia that much.

However, in the case where the filter regeneration processing is performed only during idling operation or while the engine is stopped, if the internal combustion engine is not idled or stopped over a long period of time, the filter regeneration processing will also not be performed for a long period. If in this way the filter regeneration processing is not performed over a long period of time, the amount of buildup of PM on the particulate filter will increase and the pressure loss caused by the particulate filter will become large.

Therefore, in consideration of the above problem, an object of the present disclosure is to provide an exhaust purification system of an internal combustion engine which has a particulate filter and selective reduction catalyst wherein ammonia slip at the selective reduction catalyst can be suppressed while processing for regeneration of the particulate filter can be efficiently performed.

Solution to Problem

To solve this problem, in a first aspect of the disclosure, there is provided an exhaust purification system of an internal combustion engine, comprising: a particulate filter which is provided in an engine exhaust passage; a selective reduction catalyst which is provided in the engine exhaust passage at a downstream side from said particulate filter in a direction of exhaust flow; an ammonia ingredient feed device which feeds an ammonia ingredient to said selective reduction catalyst; a control device which controls the amount of feed of ammonia ingredient from said ammonia ingredient feed device so that the amount of the ammonia ingredient which is adsorbed at said selective reduction catalyst becomes a target adsorption amount; and a filter regeneration system which performs filter regeneration processing to remove PM which has built up on said particulate filter, when an execution start condition of the filter regeneration processing stands, wherein when removal of PM which has built up on said particulate filter is demanded, so long as the execution start condition of the filter regeneration processing by said filter regeneration system does not stand, said target adsorption amount is decreased a plurality of times in stages, and said execution start condition of the filter regeneration processing is changed to a different condition at each stage of said target adsorption amount.

In a second aspect of the disclosure, there is provided with the first aspect of the disclosure, wherein the execution start condition of the filter regeneration processing is set to a condition with a higher frequency of standing as said target adsorption amount is decreased in stages.

In a third aspect of the disclosure, there is provided with the second aspect of the disclosure, wherein each execution start condition of said filter regeneration processing stands when the engine speed is a respective predetermined speed or less; and wherein said predetermined speed is set to a higher speed as said target adsorption amount is decreased in stages.

In a fourth aspect of the disclosure, there is provided with any one of the first to third aspects of the disclosure, wherein said target adsorption amount is again decreased if a cumulative value of amount of discharge of $NO_X$ reaches a predetermined amount after said target adsorption amount is decreased a previous time.

In a fifth aspect of the disclosure, there is provided with any one of the first to fourth aspects of the disclosure, wherein said filter regeneration system has a plurality of filter regenerating means for removing PM which has built up on said particulate filter; and wherein at each stage of said target adsorption amount, when said execution start condition of the filter regeneration processing stands, a filter regenerating means which partially differs for each stage of said target adsorption amount is used to remove PM which has built up on said particulate filter.

In a sixth aspect of the disclosure, there is provided with any one of the first to fifth aspects of the disclosure, wherein said filter regeneration system has a plurality of filter regenerating means for removing PM which has built up on said particulate filter; when removal of PM which has built up on said particulate filter is demanded, so long as the execution start condition of the filter regeneration processing by said filter regeneration system does not stand, as a first stage, said target adsorption amount is set to a first adsorption amount and as a second stage, said target adsorption amount is set to a second adsorption amount smaller than said first adsorption amount; when said target adsorption amount is set to said first adsorption amount, said execution start condition of the filter regeneration processing is set to a first condition, and when said target adsorption amount is set to said first adsorption amount and said execution start condition of the filter regeneration processing stands, PM which has built up on said particulate filter is removed by a first filter regenerating means; and when said target adsorption amount is set to said second adsorption amount, said execution start condition of the filter regeneration processing is set to a second condition with a higher frequency of standing than said first condition, and when said target adsorption amount is set to said second adsorption amount and said execution start condition of the filter regeneration processing stands, said particulate filter is risen in temperature by a second filter regenerating means which is at least partially different from said first filter regenerating means.

In a seventh aspect of the disclosure, there is provided with sixth aspect of the disclosure, wherein at the time of normal operation when removal of PM which has built up on said particulate filter is not demanded, said target adsorption amount is set to a normal target adsorption amount which is set based on an operation parameter of the internal combustion engine; when removal of PM which has built up on said particulate filter is demanded, if said first adsorption amount is larger than said normal target adsorption amount, at said first stage, said target adsorption amount is set to said normal target adsorption amount instead of said first adsorption amount; and when removal of PM which has built up on said particulate filter is demanded, if said second adsorption amount is greater than said normal target adsorption amount, at said second stage, said target adsorption amount is set to said normal target adsorption amount instead of said second adsorption amount.

In a eighth aspect of the disclosure, there is provided with sixth or seventh aspect of the disclosure, further comprising: a heater which heats said particulate filter by electric power; a secondary air feed device which feeds secondary air to said particulate filter; and a fuel addition valve which feeds fuel to said particulate filter, wherein said first condition stands when the engine speed becomes zero; said first filter regenerating means makes the particulate filter rise in temperature by said heater and feeds secondary air from said secondary air feed device when removing PM which has built up on said particulate filter; and said second filter regenerating means feeds fuel from said fuel addition valve to said particulate filter when removing PM which has built up on said particulate filter.

In a ninth aspect of the disclosure, there is provided with sixth or seventh aspect of the disclosure, further comprising: a heater which heats said particulate filter by electric power; and a fuel addition valve which feeds fuel to said particulate filter, wherein said first condition stands when the engine speed is a predetermined idling upper limit speed, which is higher than zero, or less; said first filter regenerating means makes the particulate filter rise in temperature by said heater and feeds fuel from said fuel addition valve to said particulate filter when removing PM which has built up on said particulate filter; and said second filter regenerating means does not use said heater to make the particulate filter rise in temperature but feeds fuel from said fuel addition valve to said particulate filter when removing PM which has built up on said particulate filter.

In a tenth aspect of the disclosure, there is provided with sixth or seventh aspect of the disclosure, further comprising: a heater which heats said particulate filter by electric power; a secondary air feed device which feeds secondary air to said particulate filter; and a fuel addition valve which feeds fuel to said particulate filter, wherein said first condition stands when the engine speed becomes zero, while said second condition stands when the engine speed is a predetermined idling upper limit speed, which is higher than zero, or less, said first filter regenerating means makes the particulate filter rise in temperature by the heater and feeds secondary air from said secondary air feed device when removing PM which has built up on said particulate filter, and said second filter regenerating means makes the particulate filter rise in temperature by said heater and feeds fuel from said fuel addition valve to said particulate filter when removing PM which has built up on said particulate filter.

In a 11th aspect of the disclosure, there is provided with sixth or seventh aspect of the disclosure, wherein when removal of PM which has built up on said particulate filter is demanded, so long as the filter regeneration processing by said filter regeneration system is not started, as a third stage, said target adsorption amount is set to a third adsorption amount which is smaller than said second adsorption amount; and when said target adsorption amount is set to said third adsorption amount, said execution start condition of the filter regeneration processing is set to a third condition with a higher frequency of standing than said second condition, and when said target adsorption amount is set to said third adsorption amount and said execution start condition of the filter regeneration processing stands, PM which has built up on said particulate filter is removed by a third filter regenerating means which is at least partially different from said first filter regenerating means and said second filter regenerating means.

In a 12th aspect of the disclosure, there is provided with 11th aspect of the disclosure, further comprising: a heater which heats said particulate filter by electric power; a secondary air feed device which feeds secondary air to said particulate filter, and a fuel addition valve which feeds fuel to said particulate filter, wherein said first condition stands when the engine speed becomes zero while said second condition stands when the engine speed is a predetermined idling upper limit speed, which is higher than zero, or less; said first filter regenerating means makes the particulate filter rise in temperature by said heater and feeds secondary air from said secondary air feed device when removing PM which has built up on said particulate filter; said second filter regenerating means makes the particulate filter rise in temperature by said heater and feeds fuel from said fuel addition valve to said particulate filter when removing PM which has built up on said particulate filter; and said third filter regenerating means does not use said heater to raise the temperature of the particulate filter but feeds fuel from said fuel addition valve to said particulate filter when removing PM which has built up on said particulate filter.

Advantageous Effects

According to the present disclosure, it becomes possible to suppress ammonia slip at the selective reduction catalyst while processing for regeneration of the particulate filter can be efficiently performed in an exhaust purification system of an internal combustion engine which has a particulate filter and selective reduction catalyst wherein.

DESCRIPTION OF EMBODIMENTS

Figure 1:
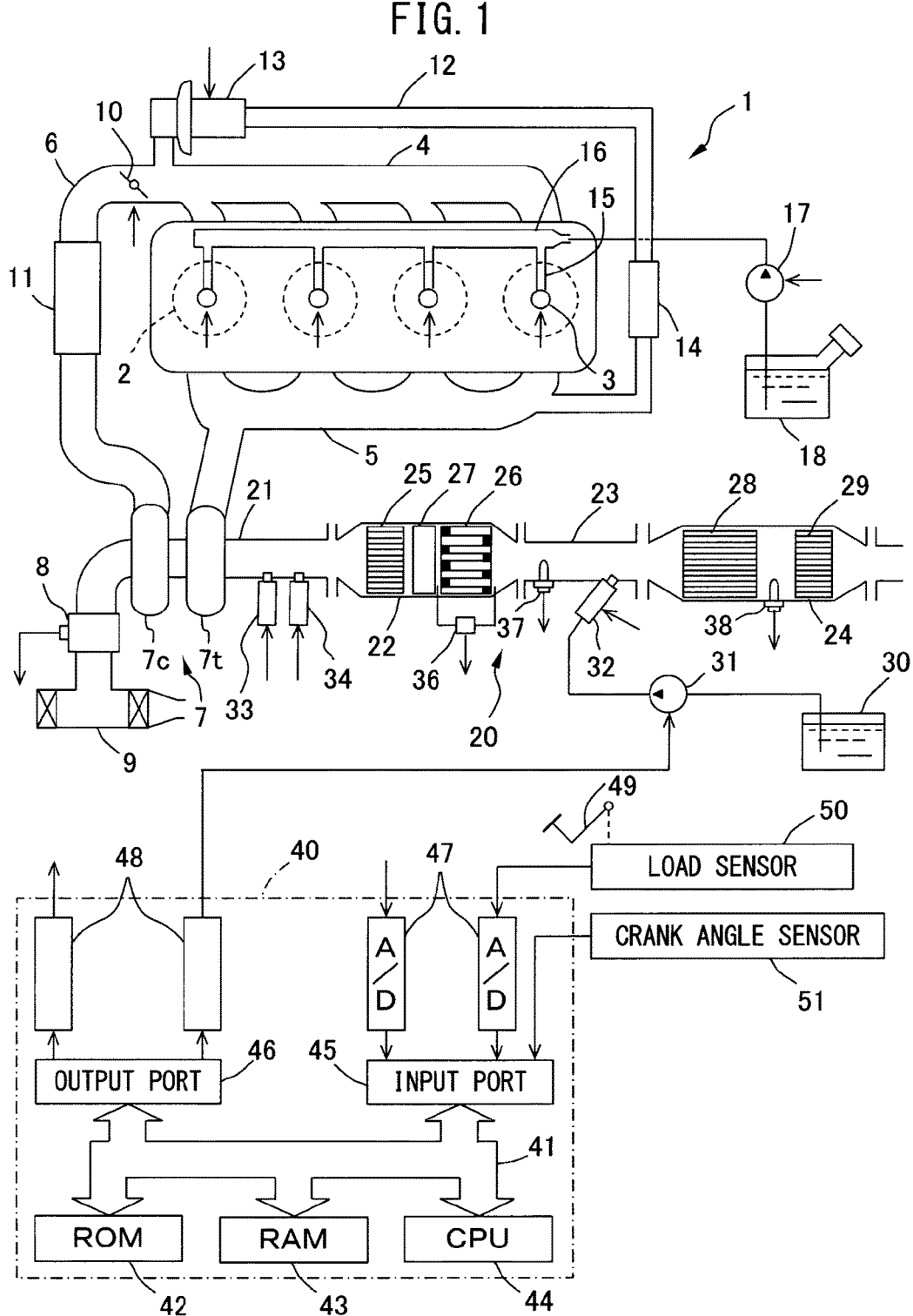
FIG. 1 is a schematic overall view of an internal combustion engine in which an exhaust purification system of the present disclosure is mounted.

Below, referring to the drawings, embodiments of the present disclosure will be explained in detail. Note that, in the following explanation, similar component elements are assigned the same reference notations.

<Configuration of Internal Combustion Engine>

Referring to FIG. 1, 1 indicates an engine body, 2 a combustion chamber of a cylinder, 3 an electronic control type fuel injector for injecting fuel into a combustion chamber 2, 4 an intake manifold, and 5 an exhaust manifold. The intake manifold 4 is connected through an intake duct 6 to an outlet of a compressor 7c of an exhaust turbocharger 7. An inlet of the compressor 7c is connected through an intake duct provided with an air flow meter 8, to an air cleaner 9. Inside the intake duct 6, an electrical control type throttle valve 10 is arranged. Further, around the intake duct 6, a cooling device 11 is arranged for cooling the intake air flowing through the inside of the intake duct 6. On the other hand, the exhaust manifold 5 is connected to an inlet of an exhaust turbine 7t of an exhaust turbocharger 7. The outlet of the exhaust turbine 7t is connected to an exhaust purification system 20.

The exhaust manifold 5 and the intake manifold 4 are connected with each other through an exhaust gas recirculation (below, referred to as "EGR") passage 12. Inside the EGR passage 12, an electrical control type EGR control valve 13 is disposed. Further, around the EGR passage 12, a cooling device 14 is arranged for cooling the EGR gas flowing through the inside of the EGR passage 12. On the other hand, each fuel injector 3 is connected through a fuel supply pipe 15 to a common rail 16. This common rail 16 is connected, through an electronic control type fuel pump 17 in which a discharge amount thereof is variable, to a fuel tank 18. The fuel in the fuel tank 18 is fed by the fuel pump 17 to the inside of the common rail 16, and the fuel which is fed to the inside of the common rail 16 is fed through each fuel supply pipe 16 to a fuel injector 3.

The exhaust purification system 20 is provided with an upstream side casing 22 which is connected through an exhaust pipe 21 to the outlet of the exhaust turbine 7*t* and a downstream side casing 24 which is connected through an exhaust pipe 23 to an upstream side casing 22. Inside of the upstream side casing 22, an oxidation catalyst or three-way catalyst 25, a particulate filter 26 for trapping particulate in the exhaust gas, and an electric heater 27 for heating the particulate filter 26 are housed. The particulate filter 26 carries the oxidation catalyst. On the other hand, inside the downstream side casing 24, an $NO_X$ selective reduction catalyst 28 which is suitable for reducing the $NO_X$ in the exhaust gas under an excess of oxygen by ammonia, and an oxidation catalyst or three-way catalyst 29 are housed.

On the other hand, a liquid which contains an ammonia generating compound which generates ammonia is stored in a tank 30. The liquid containing an ammonia generating compound, which is stored in the tank 30, is fed through a feed pump 31 and electromagnetic control type addition control valve 32 to the inside of the exhaust pipe 23. Note that, the tank 30 may store ammonia. In this case, the electromagnetic control type addition control valve 32 is used to feed the ammonia.

Further, the exhaust pipe 21 is provided with a fuel addition valve 33 which adds fuel into the exhaust gas flowing through the inside of the exhaust pipe 21 and a secondary air feed device 34 which feeds secondary air to the exhaust gas flowing through the inside of the exhaust pipe 21. Therefore, in the present embodiment, fuel and air can be fed to the particulate filter 26 by the fuel addition valve 33 and the secondary air feed device 34.

The electronic control unit 40 is comprised of a digital computer, and comprises a ROM (read only memory) 42, RAM (random access memory) 43, CPU (microprocessor) 44, input port 45, and output port 46, which are connected together by a bidirectional bus 41. The air flow meter 8 generates an output voltage which is proportional to the intake air amount. This output voltage is input through a corresponding AD converter 47 to the input port 45.

Inside the upstream side casing 22, a differential pressure sensor 36 is attached for detecting the differential pressure between before and after the particulate filter 26 (differential pressure between upstream side and downstream side of particulate filter 26 in exhaust flow direction). Further, upstream of the $NO_X$ selective reduction catalyst 28, in the exhaust pipe 23, an $NO_X$ sensor 37 is attached for detecting the amount of $NO_X$ or $NO_X$ concentration in the exhaust gas flowing into the $NO_X$ selective reduction catalyst 28. In addition, downstream of the $NO_X$ selective reduction catalyst 28 in the downstream side casing 24, an $NO_X$ sensor 38 is attached for detecting the amount of $NO_X$ or $NO_X$ concentration in the exhaust gas flowing out from the $NO_X$ selective reduction catalyst 28. The output signals of these sensors 36, 37, and 38 are input through corresponding AD converters 47 to the input port 45.

An accelerator pedal 49 is connected to a load sensor 50 which generates an output voltage proportional to the amount of depression of the accelerator pedal 49. The output voltage of the load sensor 50 is input through a corresponding AD converter 47 to the input port 45. Furthermore, the input port 45 is connected to a crank angle sensor 51 which generates an output pulse each time the crankshaft for example rotates 15°. On the other hand, the output port 46 is connected, through corresponding drive circuits 48, to the fuel injectors 3, drive device for throttle valve 10, EGR control valve 13, fuel pump 17, feed pump 31, and addition control valve 32.

<Amount of Ammonia Ingredient Held in $NO_X$ Selective Reduction Catalyst>

Now, as explained above, a liquid containing an ammonia generating compound or ammonia is fed in the exhaust pipe 23 upstream of the $NO_X$ selective reduction catalyst 28. As an ammonia generating compound which can generate ammonia, various compounds exist. Therefore, various compounds can be used as the ammonia generating compound. Specifically, as the ammonia generating compound, urea, etc., may be mentioned. Below, the case of feed of a urea aqueous solution in the exhaust pipe 23 upstream of the $NO_X$ selective reduction catalyst 28 will be explained as an example. Note that, in the Description, an ammonia generating compound and ammonia will together be referred to as an "ammonia ingredient".

On the other hand, as the $NO_X$ selective reduction catalyst 28, for example, a catalyst $V_2O_5/TiO_2$ (vanadium-titania catalyst) which has titania as a carrier and carries vanadium oxide on this carrier, or a catalyst Cu/ZSM5 (copper zeolite catalyst) which has zeolite as a carrier and carries copper on this carrier is used.

In such a configured $NO_X$ selective reduction catalyst 28, ammonia $NH_3$ is used to reduce and purify the $NO_X$ in exhaust gas containing excess oxygen. The NO in the exhaust gas is, for example, reduced by a reaction such as of the following formula (1), while the $NO_2$ in the exhaust gas is, for example, reduced by a reaction such as of the following formula (2).

$$4NH_3 + 4NO + O_2 \rightarrow 6H_2O \tag{1}$$

$$8NH_3 + 6NO_2 \rightarrow 7N_2 + 12H_2O \tag{2}$$

Further, the $NO_X$ selective reduction catalyst 28 has an adsorption ability enabling it to adsorb ammonia. Therefore, if ammonia is fed in the exhaust pipe 23 upstream of the $NO_X$ selective reduction catalyst 28, the $NO_X$ selective reduction catalyst 28 will adsorb the ammonia. Further, if a urea aqueous solution is fed in the exhaust pipe 23 upstream of the $NO_X$ selective reduction catalyst 28, the fed urea aqueous solution will be hydrolyzed by a reaction such as of the following formula (3) and ammonia will be generated. The thus generated ammonia will be adsorbed at the $NO_X$ selective reduction catalyst 28.

$$(NH_2)_2CO + H_2O \rightarrow 2NH_3 + CO_2 \tag{3}$$

The $NO_X$ purifying rate at the $NO_X$ selective reduction catalyst 28 is higher when the ammonia adsorption amount of the $NO_X$ selective reduction catalyst 28 is larger. However, there is a limit to the amount of ammonia which can be adsorbed at the $NO_X$ selective reduction catalyst 28. If the amount of ammonia which is adsorbed at the $NO_X$ selective reduction catalyst 28 reaches a certain limit adsorption amount, no further ammonia can be adsorbed. Therefore, in the present embodiment, the amount of urea aqueous solution which is fed from the addition control valve 32 is controlled so that the amount of ammonia which is adsorbed at the $NO_X$ selective reduction catalyst 28 becomes a predetermined target adsorption amount which is greater than zero and less than the limit adsorption amount.

Specifically, first, the ammonia adsorption amount at the $NO_X$ selective reduction catalyst 28 is calculated. In calculating the ammonia adsorption amount, the amount of ammonia which is fed to the $NO_X$ selective reduction catalyst 28 per unit time is calculated based on the amount of feed of the urea aqueous solution from the addition control valve 32 per unit time. In addition, the amount of $NO_X$ flowing into the $NO_X$ selective reduction catalyst 28 per unit time is calculated based on the output of the upstream side $NO_X$ sensor 37.

The purifying rate of the $NO_X$ flowing into the $NO_X$ selective reduction catalyst 28 changes according to the engine operating state. For example, the greater the current ammonia adsorption amount, the higher the $NO_X$ purifying rate. Further, if the addition control valve 32 is in the middle of feeding the urea aqueous solution, the $NO_X$ purifying rate becomes higher compared with when it is not in the middle of feeding the urea aqueous solution. Therefore, in the present embodiment, the $NO_X$ purifying rate corresponding to the engine operating state is found in advance by experiments or calculations and the relationship of the engine operating state and $NO_X$ purifying rate is stored as a map in the ROM 42 of the ECU 40. At the time of use, the $NO_X$ purifying rate is calculated based on the engine operating state by using the map, and the amount of $NO_X$ which is calculated based on the output of the upstream side $NO_X$ sensor 37 is multiplied with the $NO_X$ purifying rate. The thus calculated value expresses the amount of ammonia which is consumed at the $NO_X$ selective reduction catalyst 28. Therefore, it is possible to calculate the ammonia adsorption amount at the $NO_X$ selective reduction catalyst 28 by subtracting, from the amount of ammonia which is fed to the $NO_X$ selective reduction catalyst 28, the amount of ammonia which is consumed at the $NO_X$ reduction catalyst 28.

In the present embodiment, the amount of feed of the urea aqueous solution from the addition control valve 32 is feedback controlled so that the thus calculated ammonia adsorption amount at the $NO_X$ selective reduction catalyst 28 becomes the target adsorption amount. As a result, the $NO_X$ selective reduction catalyst 28 adsorbs a suitable amount of ammonia and, due to this, the $NO_X$ in the exhaust gas can be suitably purified.

<Filter Regeneration Control>

On the other hand, the PM contained in the exhaust gas is trapped on the particulate filter 26 and successively oxidized. However, if the amount of trapped PM becomes greater than the amount of PM which is oxidized, the PM will gradually build up on the particulate filter 26. If the amount of buildup of PM increases in this way, the pressure loss at the particulate filter 26 will increase and as a result the engine output will drop. Therefore, when the amount of buildup of PM increases, it becomes necessary to remove the built up PM. As opposed to this, if making the temperature of the particulate filter 26 rise to 600° C. or so (below, called the "PM regeneration temperature") under an excess of oxygen, the built up PM will be oxidized and removed.

For this reason, when the amount of PM which is deposited on the particulate filter 26 becomes greater, that is, when the differential pressure dP between before and after the particulate filter 26, which is detected by the differential pressure sensor 36, becomes greater, it becomes necessary to make the temperature of the particulate filter 26 rise and thereby remove the built up PM by oxidation as filter regeneration processing.

As such filter regeneration processing, for example, the three regeneration processing methods of "stop regeneration processing", "idle regeneration processing", and "forced regeneration processing" may be mentioned.

<Stop Regeneration Processing>

Among these regeneration processing methods, stop regeneration processing is regeneration processing which is performed while the internal combustion engine is stopped, that is, when the engine speed is zero. Specifically, for example, it is performed while the internal combustion engine has stopped when the vehicle mounting the engine is stopped, or while, in a vehicle which is powered by both an internal combustion engine and an electric motor, the vehicle is being driven by only the electric motor.

In stop regeneration processing, secondary air is fed to the exhaust gas by the secondary air feed device 34. While the internal combustion engine is stopped, the exhaust gas stops flowing, and therefore the gas in the exhaust pipe 21 or the particulate filter 26 flows depending on the amount of air fed by the secondary air feed device 34. In addition, in stop regeneration processing, the particulate filter 26 is heated by the electric heater 27.

In stop regeneration processing, the amount of flow of the gas through the particulate filter 26 can be made very small. For this reason, during the regeneration processing, the amount of heat robbed from the particulate filter 26 by the gas is extremely small and therefore the particulate filter 26 can be efficiently regenerated. Further, the secondary air feed device 34 can completely control the flow of gas through the particulate filter 26, and therefore the temperature of the particulate filter 26 will never unintentionally change. Therefore, according to stop regeneration processing, the temperature of the particulate filter 26 can be controlled as desired.

On the other hand, stop regeneration processing can only be performed while the internal combustion engine is stopped. However, an internal combustion engine will not necessarily be frequently stopped. Sometimes, stop regeneration processing cannot be performed for a long period of time. Therefore, the frequency by which stop regeneration processing can be performed can be said to be low.

<Idle Regeneration Processing>

On the other hand, idle regeneration processing is regeneration processing which is performed during idling operation of an internal combustion engine, that is, when the internal combustion engine is being operated at an engine speed of a predetermined idling upper limit speed (for example, 800 rpm) or less. During idling operation when idle regeneration processing is performed, the exhaust gas discharged from the combustion chamber 2 of the engine body 1 flows through the particulate filter 26, and therefore there is no need to feed intake air from the secondary air feed device 34.

Further, in idle regeneration processing, the particulate filter 26 is heated by the electric heater 27. In addition, when the electric heater 27 alone cannot make the particulate filter 26 sufficiently rise in temperature, fuel is added to the exhaust gas flowing into the particulate filter 26 by the fuel addition valve 33. The thus added fuel reacts with the oxygen in the exhaust gas and burns. Due to this, the particulate filter 26 is sufficiently heated.

In idle regeneration processing, the amount of flow of the exhaust gas through the particulate filter 26 is relatively small. For this reason, during regeneration processing, the amount of heat which is robbed from the particulate filter 26 by the exhaust gas is relatively small. Therefore, while not to the extent of the stop regeneration processing, the particulate filter 26 can be regenerated relatively efficiently. Further, in idle regeneration processing, since the engine speed is low, the amount of flow of exhaust gas through the particulate filter 26 is relatively small. For this reason, even if fuel is added by the fuel addition valve 33 and the temperature of the exhaust gas rises, it will not rise that rapidly. Therefore, in idle regeneration processing, while not to the extent of stop regeneration processing, the temperature of the particulate filter 26 can be control as desired to a certain extent.

On the other hand, idle regeneration processing can only be performed during idling operation of the internal combustion engine. However, for example, by driving on a highway and thereby medium load or high load operation continuing, sometimes an idling operation will not be performed for a long period of time. On the other hand, the frequency by which an internal combustion engine is idled is greater than the frequency by which an internal combustion engine is stopped. Therefore, the frequency by which idle regeneration processing can be performed can be said to be high to a certain extent.

<Forced Regeneration Processing>

Forced regeneration processing is regeneration processing which can basically be performed at any time during operation of an internal combustion engine. During forced regeneration processing, the internal combustion engine is operating at a certain extent of speed and, as a result, the amount of flow of exhaust gas flowing out from the internal combustion engine is large. For this reason, even if the particulate filter 26 is heated by the electric heater 27, the temperature of the particulate filter 26 cannot be raised up to the PM regeneration temperature. Therefore, in forced regeneration processing, the electric heater 27 is not used for heating, but instead the fuel addition valve 33 adds fuel into the exhaust gas. The added fuel reacts at the oxidation catalyst 25 with the oxygen in the exhaust gas and burns and whereby high temperature exhaust gas flows into the particulate filter 26. As a result, the particulate filter 26 is raised in temperature to the PM regeneration temperature.

In forced regeneration processing, a large amount of high temperature exhaust gas is fed to the particulate filter 26. However, the heat which is transmitted to the particulate filter 26 constitutes only part of this. Therefore, the exhaust gas flows out from the particulate filter 26 while at a high temperature. Therefore, in forced regeneration processing, the amount of energy (amount of fuel) which is input for regeneration of the particulate filter 26 is great and accordingly the particulate filter 26 cannot be efficiently regenerated. Further, if fuel is added by the fuel addition valve 33, high temperature exhaust gas flows into the particulate filter 26 in a large amount, and therefore the temperature of the particulate filter 26 rapidly rises. Therefore, in forced regeneration processing, it is difficult to control the temperature of the particulate filter 26 as desired.

On the other hand, forced regeneration processing can basically be performed any time during operation of an internal combustion engine. Therefore, the frequency by which forced regeneration can be performed can be said to be extremely high.

If summarizing the above-mentioned stop regeneration processing, idle regeneration processing, and forced regeneration processing, they can be expressed as in Table 1.

TABLE 1

| | Configuration | | | Characteristics | | |
|---|---|---|---|---|---|---|
| | Fuel addition | Heater | Secondary air | Regeneration efficiency | Regeneratable frequency | Temperature controllability |
| Stop regeneration | — | ○ | ○ | ◎ | △ | ◎ |
| Idle regeneration | △ | ○ | — | ○ | ○ | ○ |
| Forced regeneration | ○ | — | — | △ | ◎ | △ |

In Table 1, the "Configuration" columns show the configurations required for performing the regeneration processing. "Fuel addition" means the addition of fuel to the exhaust gas by the fuel addition valve 33, "Heater" means heating of the particulate filter 26 by the electric heater 27, and "Secondary air" means the need for feed of secondary air to the exhaust gas by the secondary air feed device 34. The dashes in the table show the actions are not required.

Further, in Table 1, the "Characteristics" columns show the characteristics in the regeneration processing. "Regeneration efficiency" shows the amount of energy which is input for regeneration of the particulate filter 26. The smaller the input energy, the better the efficiency is. "Regeneratable frequency" shows the frequency by which the regeneration processing can be performed and can be said to show the frequency by which an execution start condition of the filter regeneration processing stands (ratio of standing). "Temperature controllability" shows how well the desired temperature control can be performed during the regeneration processing, in particular, how slowly the particulate filter 26 can be raised in temperature.

<Temperature of $NO_X$ Selective Reduction Catalyst and Filter Regeneration Processing>

In the meantime, in the $NO_X$ selective reduction catalyst 28, the higher the temperature becomes, the more the maximum amount of ammonia which can be adsorbed (maximum adsorbable ammonia amount) is decreased. In particular, if the temperature of the $NO_X$ selective reduction catalyst 28 exceeds 350° C., ammonia can no longer be adsorbed much at all.

On the other hand, as explained above, to perform the filter regeneration processing, the temperature of the particulate filter 26 has to be raised to the PM regeneration temperature or more. If making the temperature of the particulate filter 26 rise to the PM regeneration temperature, along with this, the $NO_X$ selective reduction catalyst 28 arranged at the downstream side from the particulate filter 26 in the exhaust flow direction also becomes high in temperature. As a result, the $NO_X$ selective reduction catalyst 28 can no longer adsorb almost any ammonia at all and the ammonia which had been adsorbed at the $NO_X$ selective reduction catalyst 28 is released.

In this way, when performing filter regeneration processing, the ammonia which had been adsorbed at the $NO_X$ selective reduction catalyst 28 is released. At this time, if making the temperature of the $NO_X$ selective reduction catalyst 28 rapidly rise, the ammonia which had been adsorbed at the $NO_X$ selective reduction catalyst 28 is rapidly released. For this reason, a large amount of ammonia is released per unit time. Therefore, to keep the amount of ammonia which is released per unit time small at the time of filter regeneration processing, the temperature of the $NO_X$ selective reduction catalyst 28 has to be made to gradually rise.

In this regard, as explained above, when performing stop regeneration processing as the filter regeneration processing, the temperature controllability is high, and therefore the temperature of the particulate filter 26 can be made to gradually rise. For this reason, the temperature of the $NO_X$ selective reduction catalyst 28 can also be made to gradually rise. On the other hand, when performing forced regeneration processing as the filter regeneration processing, the temperature controllability is low, and therefore the temperature of the particulate filter 26 rapidly rises. Therefore, from the viewpoint of the temperature controllability of the NO$_X$ selective reduction catalyst 28 at the time of performing filter regeneration processing, stop regeneration processing is preferable.

However, as explained above, the regeneratable frequency of stop regeneration processing is low. For this reason, if delaying execution of filter regeneration processing until the execution start condition of stop regeneration processing (that is, the engine speed becoming zero) stands, in some cases, the pressure loss of the particulate filter 26 will become greatly increased. On the other hand, the regeneratable frequency of forced regeneration processing is high. For this reason, forced regeneration processing can basically be performed at any timing at which filter regeneration processing is desired to be performed.

<Filter Regeneration Control of Present Embodiment>

Therefore, in the present embodiment, filter regeneration control is performed by the following procedure while considering the characteristics of the different filter regeneration processings, that is, the characteristics of stop regeneration processing, idle regeneration processing, and forced regeneration processing.

Figure 2:
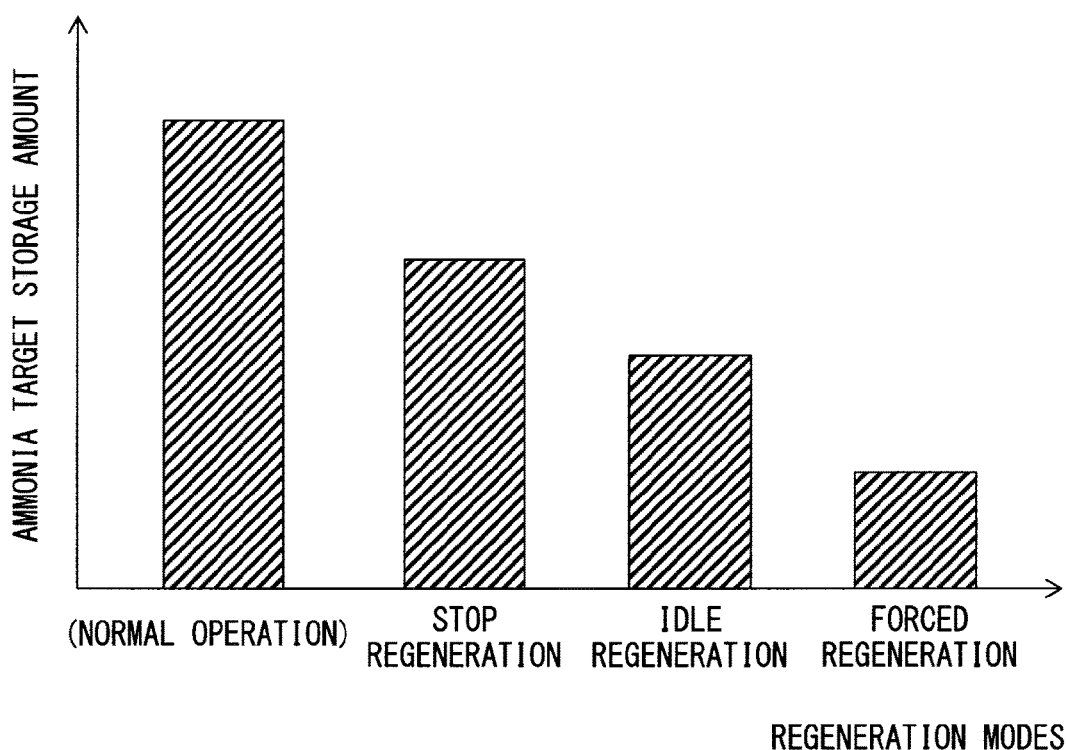
FIG. 2 is a view which shows an ammonia target adsorption amount at an $NO_X$ selective reduction catalyst in different regeneration modes.

In the present embodiment, at the time of filter regeneration processing, three regeneration modes, that is, the stop regeneration mode, idle regeneration mode, and forced regeneration mode, can be executed. If the stop regeneration mode is entered, the ammonia target adsorption amount of the NO$_X$ selective reduction catalyst 28 is set to a stop regeneration target adsorption amount. The stop regeneration target adsorption amount is an amount by which even if stop regeneration processing is performed, the amount of ammonia flowing out from the NO$_X$ selective reduction catalyst 28 per unit time will become a predetermined limit value or less. Therefore, the stop regeneration target adsorption amount, as shown in FIG. 2, is set to an amount smaller than the target adsorption amount at the time of normal operation (at the time of operation when filter regeneration processing, etc., are not being performed) (below, referred to as "normal target adsorption amount"). For this reason, during the stop regeneration mode, compared with the time of normal operation, NO$_X$ slightly easily flows out from the NO$_X$ selective reduction catalyst 28. Further, during the stop regeneration mode, if the execution start condition of the stop regeneration processing stands, that is, if the engine speed becomes zero, the stop regeneration processing is performed.

Further, if the idle regeneration mode is entered, the ammonia target adsorption amount of the NO$_X$ selective reduction catalyst 28 is set to an idle regeneration target adsorption amount. The idle regeneration target adsorption amount is an amount by which even if idle regeneration processing is performed, the amount of ammonia flowing out from the NO$_X$ selective reduction catalyst 28 per unit time becomes a predetermined limit value or less. Therefore, the idle regeneration target adsorption amount, as shown in FIG. 2, is set to an amount smaller than the stop regeneration target adsorption amount. For this reason, during the idle regeneration mode, NO$_X$ more easily flows out from the NO$_X$ selective reduction catalyst 28 compared with the stop regeneration mode. Further, during the idle regeneration mode, if the execution start condition of the idle regeneration processing stands, that is, if the engine speed becomes the idling upper limit speed or less, idle regeneration processing is performed.

In addition, if the forced regeneration mode is entered, the ammonia target adsorption amount to the NO$_X$ selective reduction catalyst 28 is set to a forced regeneration target adsorption amount. The forced regeneration target adsorption amount is an amount by which even if forced regeneration processing is performed, the amount of ammonia flowing out from the NO$_X$ selective reduction catalyst 28 per unit time will become a predetermined limit value or less. Therefore, the forced regeneration target adsorption amount, as shown in FIG. 2, is set to an amount smaller than the idle regeneration target adsorption amount. Further, if the forced regeneration mode is entered, basically the forced regeneration processing is performed along with this. However, it is possible to set the forced regeneration mode so that forced regeneration processing is not performed when the engine load is high and the engine speed is high. In such a case, during the forced regeneration mode, if the execution start condition of the forced regeneration processing stands, that is, when the engine load is a predetermined value or less and the engine speed is a predetermined speed (speed higher than idling upper limit speed) or less, the forced regeneration processing is performed.

In addition, in the present embodiment, when regeneration of the particulate filter 26 is demanded, for example, when the amount of buildup of PM of the particulate filter 26 is a judgment reference amount or more, first the stop regeneration mode is entered. Further, if the stop regeneration processing is not performed in a predetermined stop regeneration limit time frame from when the stop regeneration mode was started, the stop regeneration mode is switched to the idle regeneration mode. After that, if the idle regeneration processing is not performed in a predetermined idle regeneration limit time frame from when the idle regeneration mode was started, the forced regeneration mode is started.

Note that, in each regeneration mode, the regeneration processing is actually performed after the amount of adsorption of ammonia at the NO$_X$ selective reduction catalyst 28 reaches the target adsorption amount. Therefore, for example, even if the stop regeneration mode is entered and then right after that the engine speed becomes zero, the stop regeneration processing is not started until the actual ammonia adsorption amount reaches the stop regeneration target adsorption amount.

Figure 3:
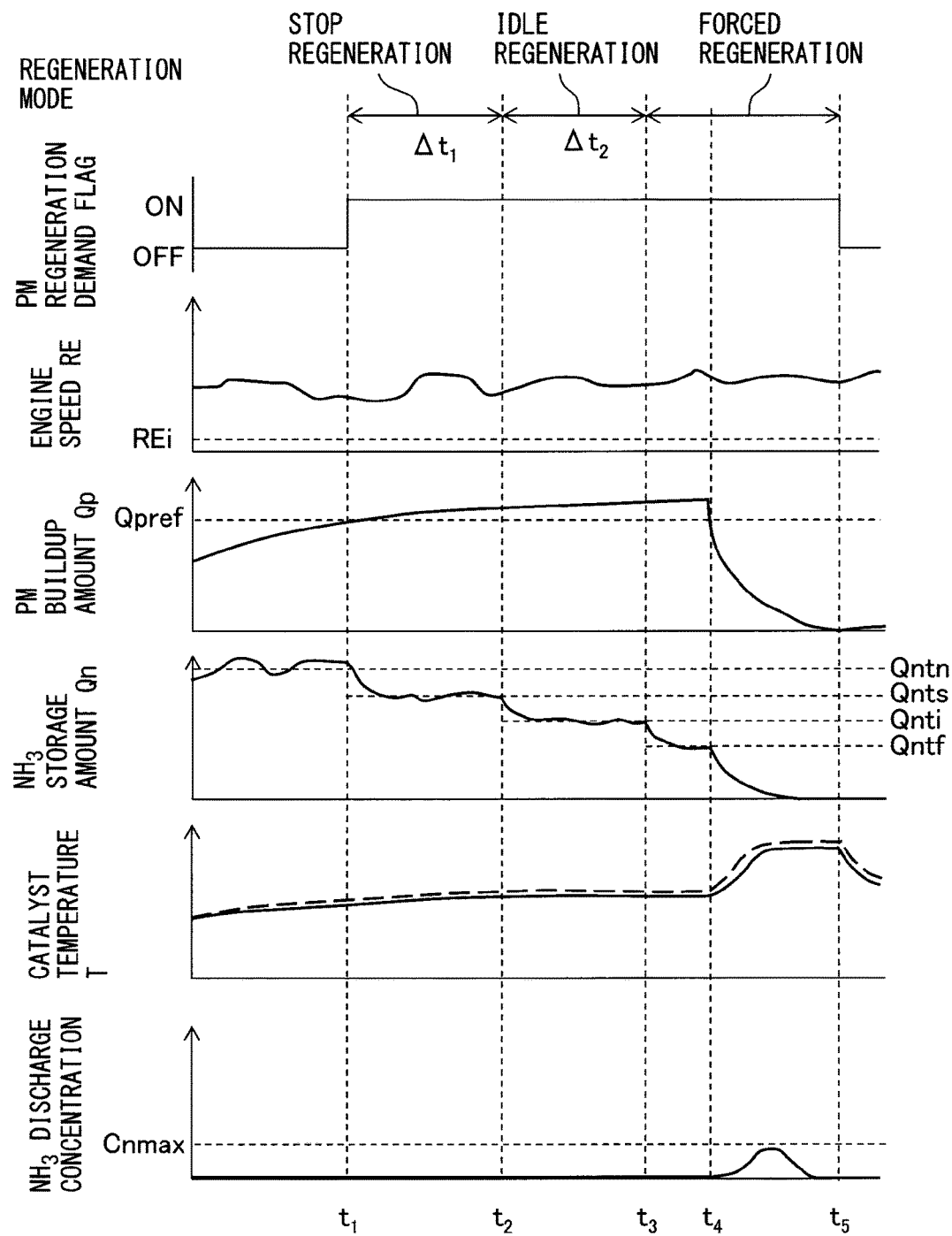
FIG. 3 is a time chart of engine speed, etc., when performing filter regeneration control in a first embodiment.

<Time Chart of FIG. 3>

FIG. 3 is a time chart of the engine speed RE, PM buildup amount Qp, ammonia adsorption amount Qn, temperature T of the NO$_X$ selective reduction catalyst 28, and concentration Cn of ammonia discharged from the NO$_X$ selective reduction catalyst 28, when the control for regeneration of the particulate filter 26 is performed in the present embodiment. The broken line at the catalyst temperature T shows the temperature of the particulate filter 26.

In the example which is shown in FIG. 3, before the time $t_1$, filter regeneration control is not performed and only normal operation is performed. Therefore, at this time, the ammonia target adsorption amount Qnt in the NO$_X$ selective reduction catalyst 28 is set to the normal target adsorption amount Qntn. The normal target adsorption amount Qntn is, for example, an amount near the maximum adsorbable ammonia amount when the temperature of the NO$_X$ selective reduction catalyst 28 becomes a predetermined temperature lower than 350° C. Alternatively, the normal target adsorption amount Qntn may be set to change in accordance with the temperature of the NO$_X$ selective reduction catalyst 28. In this case, the higher the temperature becomes, the smaller the normal target adsorption amount Qntn is set to.

Further, before the time $t_1$, the filter regeneration control is not performed, and therefore the amount of buildup of PM at the particulate filter 26 gradually increases. In the illustrated example, the PM buildup amount Qp reaches the judgment reference amount Qpref at the time $t_1$. If the PM buildup amount Qp reaches the judgment reference amount Qpref in this way, the PM regeneration demand flag will be set to ON and the filter regeneration control will be started.

As explained above, in the present embodiment, if the filter regeneration control is started, first, the stop regeneration mode is entered. For this reason, at the time $t_1$, the ammonia target adsorption amount Qnt in the $NO_X$ selective reduction catalyst 28 is decreased from the normal target adsorption amount Qntn to the stop regeneration target adsorption amount Qnts. If the target adsorption amount Qnt is decreased in this way, along with this, the actual ammonia adsorption amount Qn also is gradually decreased. The ammonia adsorption amount Qnt is decreased by decreasing the amount of feed of the urea aqueous solution from the addition control valve 32. After that, the actual ammonia adsorption amount Qn is maintained near the stop regeneration target adsorption amount Qnts.

If the engine speed RE becomes zero during the stop regeneration mode, stop regeneration processing is performed. However, in the example shown in FIG. 3, in the stop regeneration limit time frame $\Delta t_1$ from the time $t_1$ when the stop regeneration mode is started, the engine speed RE does not become zero. For this reason, during this time frame, stop regeneration processing does not be performed. Therefore, in the example shown in FIG. 3, at the time $t_2$ when the stop regeneration limit time frame $\Delta t_1$ elapses from the time $t_1$ when the stop regeneration mode is started, the regeneration mode is switched from the stop regeneration mode to the idle regeneration mode.

If the idle regeneration mode is entered at the time $t_2$, the ammonia target adsorption amount Qnt in the $NO_X$ selective reduction catalyst 28 is decreased from the stop regeneration target adsorption amount Qnts to the idle regeneration target adsorption amount Qnti. Along with this, the actual ammonia adsorption amount Qn is also gradually decreased. After that, the actual ammonia adsorption amount Qn is maintained near the idle regeneration target adsorption amount Qnti.

If the engine speed becomes the idling upper limit speed REi or less during the idle regeneration mode, the idle regeneration processing is performed. However, in the example shown in FIG. 3, in the idle regeneration limit time frame $\Delta t_2$ from the time $t_2$ when the idle regeneration mode is started, the engine speed does not become the idling upper limit speed REi or less. For this reason, during this time frame, the idle regeneration processing is not performed. Therefore, in the example shown in FIG. 3, at the time $t_3$ when the idle regeneration limit time frame $\Delta t_2$ elapses from the time $t_2$ when the idle regeneration mode is started, the regeneration mode is switched from the idle regeneration mode to the forced regeneration mode.

If the forced regeneration mode is entered at the time $t_3$, the ammonia target adsorption amount Qnt in the $NO_X$ selective reduction catalyst 28 is decreased from the idle regeneration target adsorption amount Qnti to the forced regeneration target adsorption amount Qntf. Along with this, the actual ammonia adsorption amount Qn is also gradually decreased.

After that, if, at the time $t_4$, the actual ammonia adsorption amount is decreased to an amount near the forced regeneration target adsorption amount Qntf, the forced regeneration processing is performed. Therefore, fuel is added from the fuel addition valve 33 to the exhaust gas. Due to this, the temperature of the particulate filter 26 (broken line in the figure) rises to the PM regeneration temperature. If the particulate filter 26 rises in temperature in this way, along with this, the $NO_X$ selective reduction catalyst 28 also rises in temperature. Therefore, after the time $t_4$, the temperature T of the $NO_X$ selective reduction catalyst 28 rises. Along with this temperature rise, the ammonia adsorption amount Qn of the $NO_X$ selective reduction catalyst 28 is decreased and the $NO_X$ selective reduction catalyst 28 discharges ammonia.

However, at the time $t_4$, the ammonia adsorption amount Qn of the $NO_X$ selective reduction catalyst 28 is decreased to near the forced regeneration target adsorption amount Qntf. Therefore, from the time $t_4$, even if forced regeneration processing causes the $NO_X$ selective reduction catalyst 28 to discharge ammonia, the ammonia discharge concentration Cn at this time will not become that high and is kept to a predetermined limit value Cnmax or less.

After that, if, at the time $t_5$, the PM buildup amount Qp of the particulate filter 26 reaches substantially zero, the forced regeneration processing is ended. Therefore, after the time $t_5$, normal operation of the internal combustion engine is performed. For this reason, after the time $t_5$, the PM buildup amount Qp of the particulate filter 26 gradually increases and the amount of absorption of ammonia by the $NO_X$ selective reduction catalyst 28 gradually increases toward the normal target adsorption amount.

Figure 4:
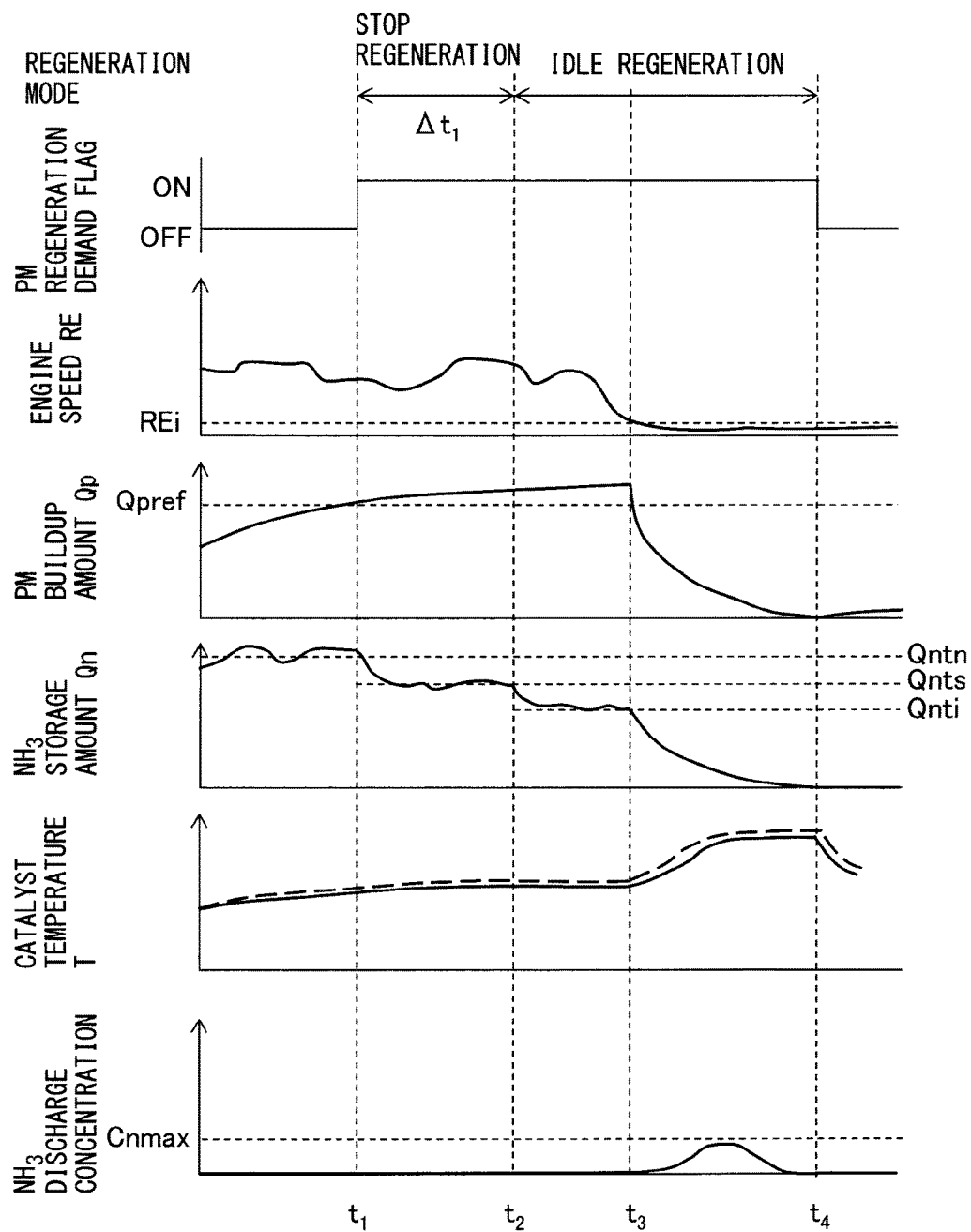
FIG. 4 is a time chart similar to FIG. 3 when performing filter regeneration control in the first embodiment.

<Time Chart of FIG. 4>

FIG. 4 is a time chart similar to FIG. 3 when performing the filter regeneration control in the present embodiment. However, in the example shown in FIG. 4, the case is shown where during the idle regeneration mode, the engine speed RE becomes the idling upper limit speed REi or less and therefore the idle regeneration execution start condition stands.

In the example shown in FIG. 4, up to the time $t_2$, the parameters follow similar trends as with the example shown in FIG. 3. If, at the time $t_2$, the idle regeneration mode is entered, the ammonia target adsorption amount Qnt in the $NO_X$ selective reduction catalyst 28 is decreased to the idle regeneration target adsorption amount Qnti. Along with this, the actual ammonia adsorption amount Qn is maintained near the idle regeneration target adsorption amount Qnti.

In the example shown in FIG. 4, when the idle regeneration mode is started and the actual ammonia adsorption amount Qn is being maintained near the idle regeneration target adsorption amount Qnti, at the time $t_3$, the engine speed RE falls to the idling upper limit speed REi or less. Therefore, at the time $t_3$, the execution start condition of the idle regeneration processing stands and the idle regeneration processing is performed. Therefore, the particulate filter 26 is heated by the electric heater 27 and fuel is added to the exhaust gas by the fuel addition valve 33. Due to this, the temperature of the particulate filter 26 rises to the PM regeneration temperature.

However, idle regeneration processing is performed during idling operation of an internal combustion engine, and therefore the temperature of the particulate filter 26 can be made to rise relatively slowly. As a result, the speed of rise of the temperature of the $NO_X$ selective reduction catalyst 28 in the idle regeneration processing becomes slower compared with when performing forced regeneration processing. For this reason, even if ammonia is discharged from the $NO_X$ selective reduction catalyst 28 as a result of idle regeneration processing, the ammonia discharge concentration Cn is kept small. Therefore, at the time of idle regeneration processing, even if the ammonia adsorption amount Qn of the $NO_X$ selective reduction catalyst 28 is set to an idle regeneration target adsorption amount Qnti which is larger than the forced regeneration target adsorption amount Qntf, the ammonia discharge concentration Cn can be kept down to a predetermined limit value Cnmax or less.

As explained above, in the present embodiment, when regeneration of the particulate filter 26 is demanded, so long as the filter regeneration processing is not started, the regeneration mode is successively switched. Along with this switching of the regeneration mode, the ammonia target adsorption amount for the $NO_X$ selective reduction catalyst 28 is decreased several times in stages. Further, every regeneration mode, the execution start condition of the filter regeneration processing is changed, and therefore in the present embodiment, the execution start condition of the filter regeneration processing can be said to be changed at each stage of ammonia target adsorption amount. In particular, in the present embodiment, as the ammonia target adsorption amount is decreased in stages, an execution start condition is changed to that with a higher frequency of standing.

In addition, in the present embodiment, at least partially different filter regenerating means are used for the different regeneration processings. For example, in the stop regeneration processing, as the filter regenerating means, the electric heater 27 and secondary air feed device 34 are used, while in the idle regeneration processing, as the filter regenerating means, the electric heater 27 and, in some cases, the fuel addition valve 33 are used. In addition, in forced regeneration processing, as the filter regenerating means, only the fuel addition valve 33 is used. Therefore, in the present embodiment, at each stage of the ammonia target adsorption amount, it can be said that at least a partially different filter regenerating means is used for the filter regeneration processing.

In this way, according to the present embodiment, if regeneration of the particulate filter 26 is demanded, the execution start condition of the filter regeneration processing is changed in stages to an execution start condition with a higher frequency of standing. However, in the filter regeneration processing which can be performed at an execution start condition with a high frequency of standing, compared with the filter regeneration processing which can be performed at an execution start condition with a low frequency of standing, the ammonia which was adsorbed at the $NO_X$ selective reduction catalyst 28 easily flows out. Therefore, in the present embodiment, along with changing the execution start condition of the filter regeneration processing in stages, the ammonia target adsorption amount for the $NO_X$ selective reduction catalyst 28 is decreased in stages. According to the present embodiment, by performing such control, it is possible to suppress the outflow of ammonia from the $NO_X$ selective reduction catalyst 28 while highly efficiently performing the regeneration processing of the particulate filter 26.

Note that, in the above embodiment, the time after the start of the stop regeneration mode until switching the regeneration mode to the idle regeneration mode (stop regeneration limit time frame) and the time after the start of the idle regeneration mode until switching the regeneration mode to the forced regeneration mode (idle regeneration limit time frame) are predetermined values. However, these time frames may also be changed in accordance with the temperature of the $NO_X$ selective reduction catalyst 28 or the amount of flow of $NO_X$ which flows into the $NO_X$ selective reduction catalyst 28. In this case, the higher the temperature of the $NO_X$ selective reduction catalyst 28, the shorter the time frame is set, while the larger the amount of flow of $NO_X$, the shorter the time frame is set.

Alternatively, the stop regeneration mode may be switched to the idle regeneration mode and the idle regeneration mode may be switched to the forced regeneration mode, based on the amount of discharge of $NO_X$ from the $NO_X$ selective reduction catalyst 28 per unit time or per unit running distance or the cumulative value of the same. In this case, for example, if the amount of discharge of $NO_X$ reaches a predetermined upper limit value after the start of the stop regeneration mode, the regeneration mode is switched from the stop regeneration mode to the idle regeneration mode. Alternatively, if the cumulative value of the amount of discharge of $NO_X$ from the start of the stop regeneration mode reaches a predetermined upper limit value, the regeneration mode is switched from the stop regeneration mode to the idle regeneration mode.

Further, in the above embodiment, the execution start conditions of the stop regeneration processing and idle regeneration processing are both set based on only the engine speed. However, the execution start conditions of these regeneration processings may also use other parameters in addition to the engine speed. As such parameters, the engine load, the speed of the vehicle which mounts the internal combustion engine, etc., may be mentioned.

<Flow Charts>

Figure 5:
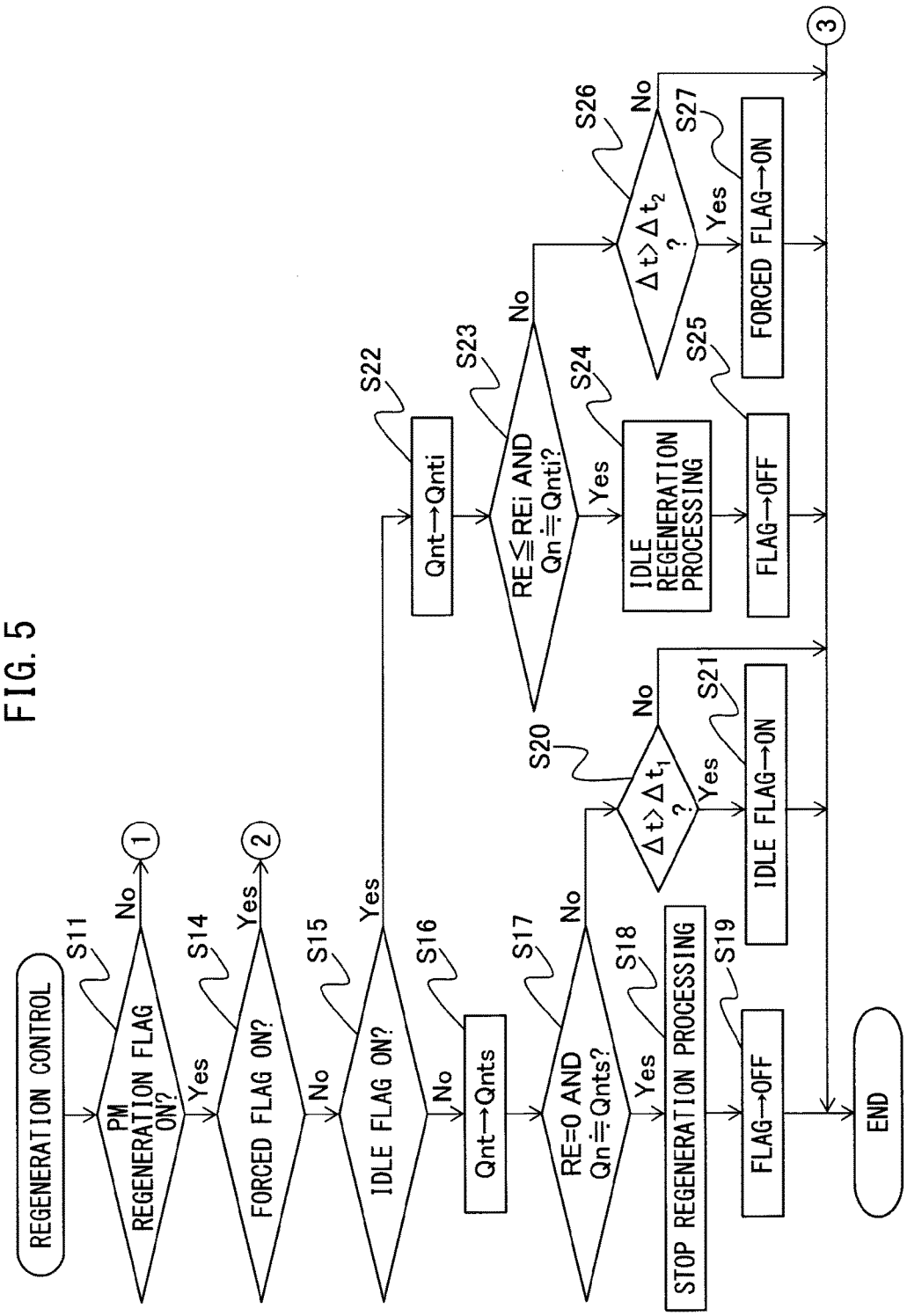
FIG. 5 is part of a flow chart which shows a control routine of filter regeneration control in the first embodiment.
Figure 6:
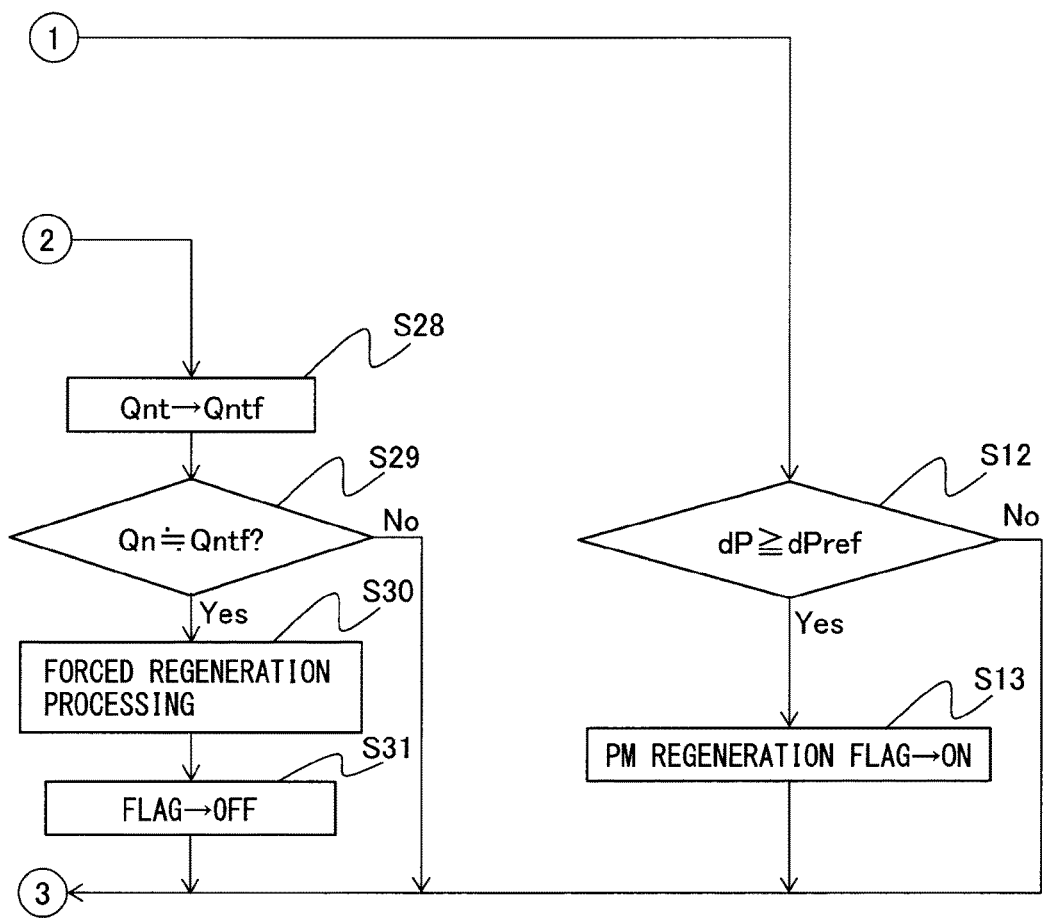
FIG. 6 is part of a flow chart which shows a control routine of filter regeneration control in the first embodiment.

FIGS. 5 and 6 are flow charts which show a control routine of filter regeneration control in the present embodiment. The illustrated control routine is performed by interruption at fixed time intervals.

As shown in FIGS. 5 6, first, at step S11, it is judged if a PM regeneration flag is set to ON. A PM regeneration flag is a flag which is set to ON when regeneration of the particulate filter 26 is demanded and which is set to OFF otherwise. When at step S11 the PM regeneration flag is set to OFF, the routine proceeds to step S12.

At step S12, it is judged if the differential pressure dP between before and after the particulate filter 26 which is detected by the differential pressure sensor 36 is a judgment reference differential pressure dPref or more. The differential pressure dP between before and after the particulate filter 26 changes in accordance with the amount of buildup of PM, and therefore at step S12, it can be said that it is judged if the amount of buildup of PM of the particulate filter 26 is a judgment reference amount or more. When it is judged that the differential pressure dP is lower than the judgment reference differential pressure dPref, that is, when it is judged that the amount of buildup of PM is smaller than the judgment reference amount, the control routine is ended. On the other hand, when it is judged at step S12 that the differential pressure dP is the judgment reference differential pressure dPref or more, that is, when it is judged that the amount of buildup of PM is the judgment reference amount or more, the routine proceeds to step S13. At step S13, the PM regeneration flag is set to ON.

If the PM regeneration flag is set to ON, at the next control routine, the routine proceeds from step S11 to step S14. At step S14, it is judged if a forced flag is set to ON. A forced flag is a flag which is set to ON during the forced regeneration mode. When the forced flag is set to OFF at step S14, the routine proceeds to step S15. At step S15, it is judged if an idling flag is set to ON. An idling flag is a flag which is set to ON during the idle regeneration mode. When the idling flag is set to OFF at step S15, the routine proceeds to step S16.

At steps S16 to S19, the stop regeneration mode is entered. First, at step S16, the ammonia target adsorption amount Qnt in the $NO_X$ selective reduction catalyst 28 is set to the stop regeneration target adsorption amount Qnts.

Next, at step S17, it is judged if the engine speed is zero and the ammonia adsorption amount Qn is near the stop regeneration target adsorption amount Qnts, that is, if the execution start condition of the stop regeneration processing is satisfied. When it is judged at step S17 that the execution start condition of the stop regeneration processing is satisfied, the routine proceeds to step S18. At step S18, the stop regeneration processing is performed. Therefore, air is fed into the exhaust gas by the secondary air feed device 34 and the particulate filter 26 is heated by the electric heater 27. Next, at step S19, the PM regeneration flag and all other flags are reset to OFF.

On the other hand, if it is judged at step S17 that the execution start condition of the stop regeneration processing is not satisfied, the routine proceeds to step S20. At step S20, it is judged if the time $\Delta t$ from when the stop regeneration mode was started is longer than the stop regeneration limit time frame $\Delta t_1$. If it is judged at step S20 that the time $\Delta t$ is the stop regeneration limit time frame $\Delta t_1$ or less, the control routine is ended. On the other hand, if it is judged at step S20 that the $\Delta t$ is longer than the stop regeneration limit time frame $\Delta t_1$, the routine proceeds to step S21. At step S21, the idling flag is set to ON and the control routine is ended.

If the idling flag is set to ON, at the next control routine, the routine proceeds from step S15 to step S22. At steps S22 to S25, the idle regeneration mode is entered. First, at step S22, the ammonia target adsorption amount Qnt in the $NO_X$ selective reduction catalyst 28 is set to the idle regeneration target adsorption amount Qnti. Next, at step S23, it is judged if the engine speed is the idling upper limit speed REi or less and the ammonia adsorption amount Qn is near the idle regeneration target adsorption amount Qnti, that is, if the execution start condition of the idle regeneration processing is satisfied. If it is judged at step S23 that the execution start condition of the idle regeneration processing is satisfied, the routine proceeds to step S24. At step S24, the idle regeneration processing is performed. Therefore, the particulate filter 26 is heated by the electric heater 27 and fuel is added to the exhaust gas flowing into the particulate filter 26 by the fuel addition valve 33. Next, at step S25, the PM regeneration flag and all other flags are reset to OFF.

On the other hand, if it is judged at step S23 that the execution start condition of the idle regeneration processing is not satisfied, the routine proceeds to step S26. At step S26, it is judged if the time $\Delta t$ from when the idle regeneration processing was started is longer than the idle regeneration limit time frame $\Delta t_2$. If it is judged at step S26 that the time $\Delta t$ is the idle regeneration limit time frame $\Delta t_2$ or less, the control routine is ended. On the other hand, if it is judged at step S26 that the time $\Delta t$ is longer than the idle regeneration limit time frame $\Delta t_2$, the routine proceeds to step S27. At step S27, the forced flag is set to ON and the control routine is ended.

If the forced flag is set to ON, at the next control routine, the routine proceeds from step S14 to step S28. At steps S28 to S31, the forced regeneration mode is entered. First, at step S28, the ammonia target adsorption amount Qnt in the $NO_X$ selective reduction catalyst 28 is set to the forced regeneration target adsorption amount Qntf. Next, at step S29, it is judged if the ammonia adsorption amount Qn is near the forced regeneration target adsorption amount Qntf. If it is judged at step S29 that the ammonia adsorption amount Qn is near the forced regeneration target adsorption amount Qntf, the routine proceeds to step S30. At step S30, the forced regeneration processing is performed. Therefore, fuel is added to the exhaust gas flowing into the particulate filter 26 by the fuel addition valve 33. Next, at step S31, the PM regeneration flag and all other flags are reset to OFF. On the other hand, if it is judged at step S29 that the ammonia adsorption amount Qn is not near the forced regeneration target adsorption amount Qntf, the control routine is ended.

Note that, in the above embodiment, the amount of buildup of PM of the particulate filter 26 is calculated by a differential pressure sensor 36 which detects the differential pressure between before and after the particulate filter 26. However, the amount of buildup of PM of the particulate filter 26 may also, for example, be calculated based on the engine load or output torque, etc., or found by another means.

Second Embodiment

Next, referring to FIG. 7, a second embodiment of the present disclosure will be explained. The configuration and control of the exhaust purification system of an internal combustion engine in the second embodiment are basically similar to the configuration and control of the exhaust purification system in the first embodiment. However, in the exhaust purification system of the second embodiment, the idle regeneration mode is not entered. Accordingly, idle regeneration processing is not performed.

That is, in the exhaust purification system of the second embodiment, when regeneration of the particulate filter 26 is demanded, first, the stop regeneration mode is performed. Further, when the stop regeneration processing is not performed in a predetermined stop regeneration limit time frame from when the stop regeneration mode was started, the regeneration mode is switched from the stop regeneration mode to the forced regeneration mode.

Figure 7:
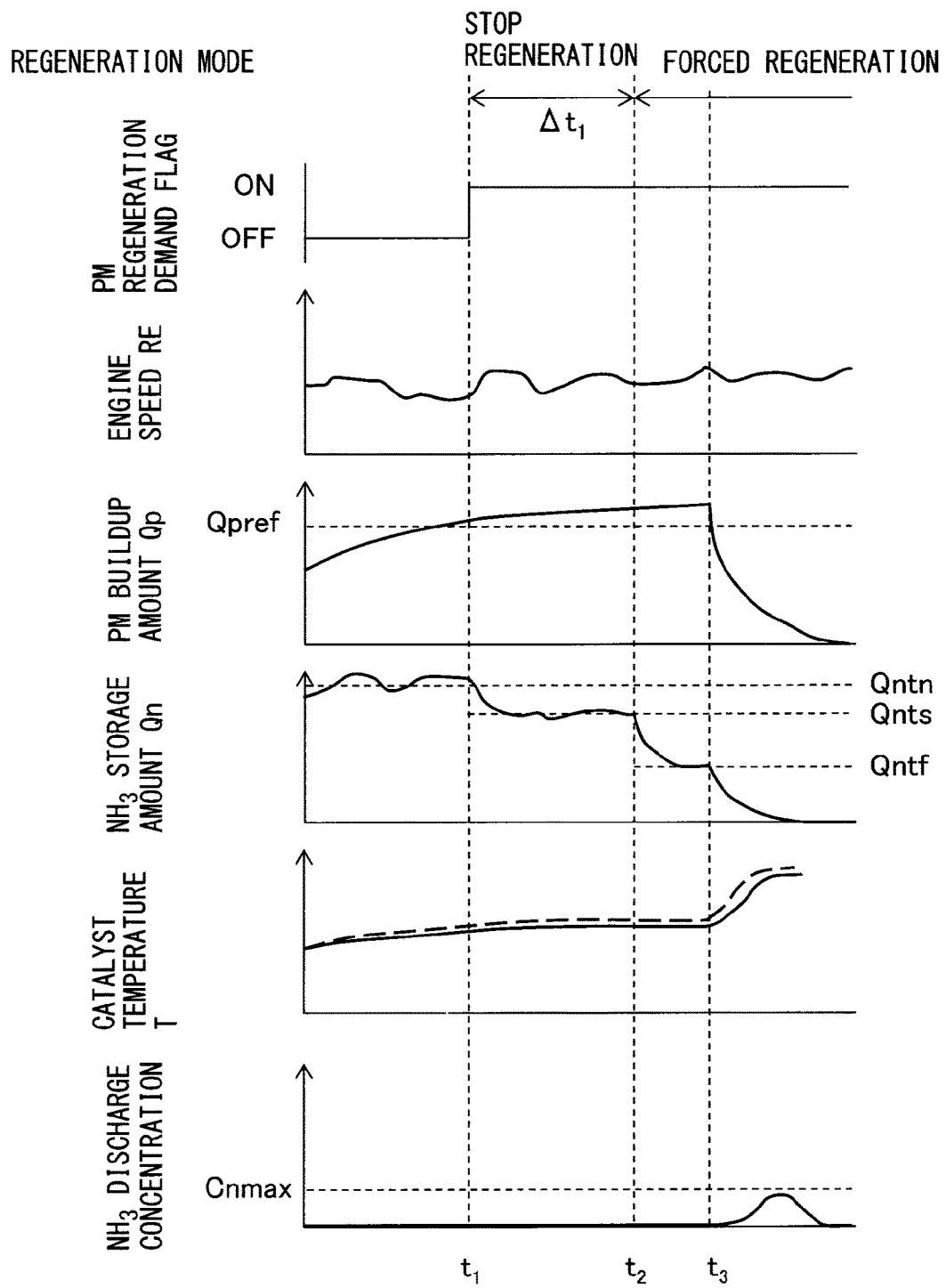
FIG. 7 is a time chart of engine speed, etc., when performing filter regeneration control in a second embodiment.

FIG. 7 is a time chart similar to FIG. 3 when performing filter regeneration control in the second embodiment. In the example shown in FIG. 7, up to the time $t_2$, the parameters follow similar trends as with the example shown in FIG. 3. However, in the present embodiment, at the time $t_2$, that is, when the stop regeneration limit time frame $\Delta t_1$ has elapsed from when the stop regeneration mode was started, the regeneration mode is switched from the stop regeneration mode to the forced regeneration mode.

If, at the time $t_2$, the forced regeneration mode is entered, the ammonia target adsorption amount Qnt in the $NO_X$ selective reduction catalyst 28 is decreased from the stop regeneration target adsorption amount Qnts to the forced regeneration target adsorption amount Qntf. Along with this, the actual ammonia adsorption amount is also decreased to near the forced regeneration target adsorption amount Qntf. At the time $t_3$, if the actual ammonia adsorption amount is decreased to near the forced regeneration target adsorption amount Qntf, the forced regeneration processing is performed. As a result, the PM which had built up at the particulate filter 26 is removed and the $NO_X$ selective reduction catalyst discharges a predetermined limit value or less of ammonia.

That is, in the present embodiment, when regeneration of the particulate filter 26 is demanded, so long as the filter regeneration processing is not started, as a first stage, the target adsorption amount is set to the first adsorption amount (stop regeneration target adsorption amount) and, as a second stage, the target adsorption amount is set to a second adsorption amount (forced regeneration target adsorption amount) which is smaller than the first adsorption amount. Further, when the target adsorption amount is set to the first adsorption amount, the execution start condition of the filter regeneration processing is set to a first condition (engine speed is zero and actual ammonia adsorption amount reaches substantially stop regeneration target adsorption amount). In addition, when the execution start condition of the filter regeneration processing stands when the target adsorption amount is set to the first adsorption amount, the PM which has built up on the particulate filter is removed by the first filter regenerating means. When the target adsorption amount is set to the second adsorption amount, the execution start condition of the filter regeneration processing is set to a second condition (actual ammonia adsorption amount reaches substantially forced regeneration target adsorption amount) with a higher frequency of standing than the first condition. In addition, when the execution start condition of the filter regeneration processing stands when the target adsorption amount is set to the second adsorption amount, the temperature of the particulate filter is raised by a second filter regenerating means which is at least partially different from the first filter regenerating means.

Third Embodiment

Next, referring to FIG. 8, a third embodiment of the present disclosure will be explained. The configuration and control of the exhaust purification system of an internal combustion engine in the third embodiment are basically similar to the configuration and control of the exhaust purification system in the first embodiment. However, in the exhaust purification system of the third embodiment, the stop regeneration mode is not entered and accordingly the stop regeneration processing is not performed.

That is, in the exhaust purification system of the third embodiment, when regeneration of the particulate filter 26 is demanded, first, the idle regeneration processing is performed. Further, when the idle regeneration processing is not performed in a predetermined idle regeneration limit time frame from when the idle regeneration mode was started, the regeneration mode is switched from the idle regeneration mode to the forced regeneration mode.

Figure 8:
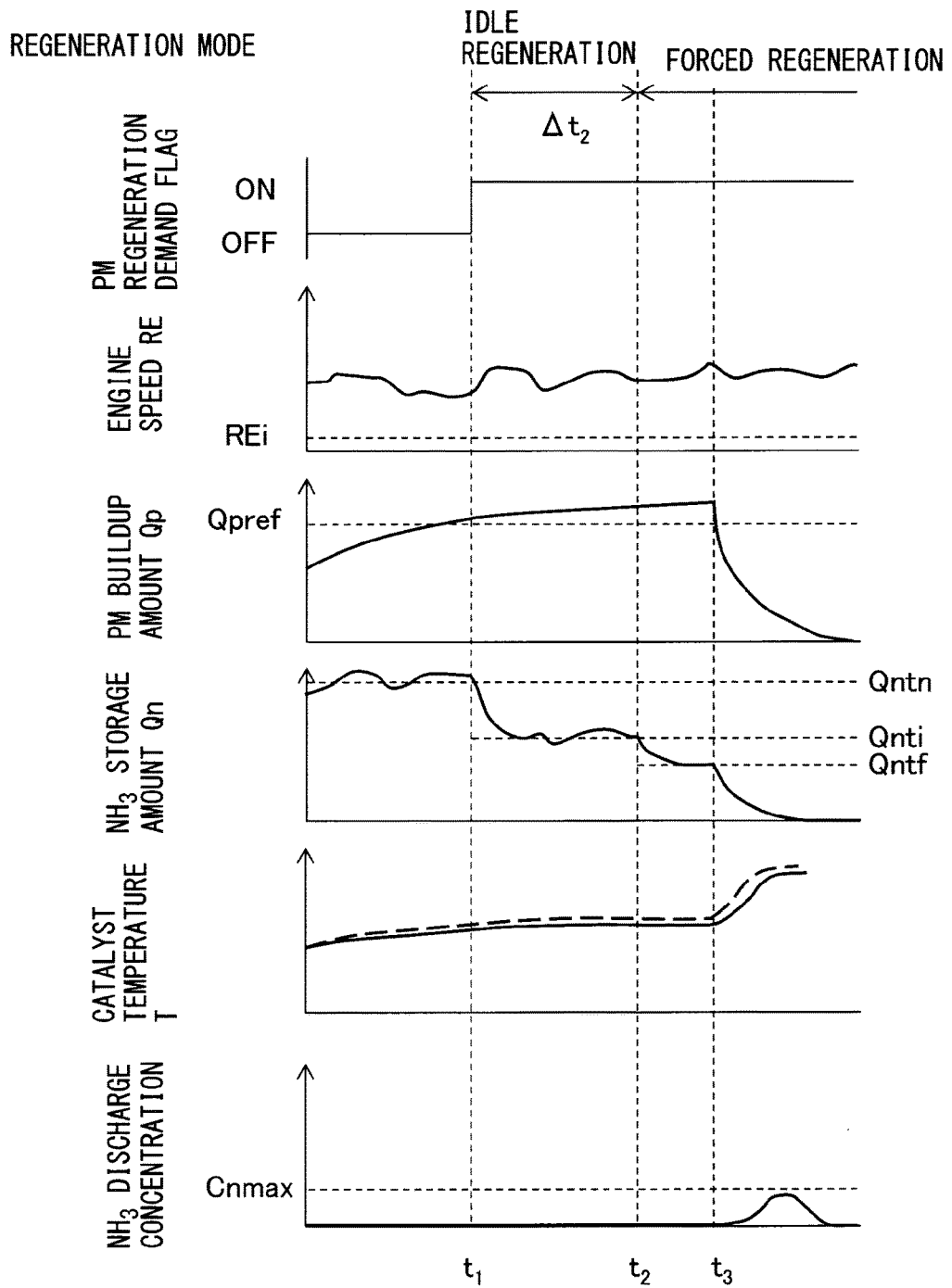
FIG. 8 is a time chart of engine speed, etc., when performing filter regeneration control in a third embodiment.

FIG. 8 is a time chart similar to FIG. 3 when performing filter regeneration control in the third embodiment. In the example shown in FIG. 8, at the time $t_1$, the PM buildup amount Qp of the particulate filter 26 reaches the judgment reference amount Qpref and filter regeneration control is started. If filter regeneration control is started, in the present embodiment, first, the idle regeneration mode is entered. Therefore, at the time $t_1$, the ammonia target adsorption amount Qnt in the $NO_X$ selective reduction catalyst 28 is decreased from the normal target adsorption amount Qntn to the idle regeneration target adsorption amount Qnti. Along with this, the actual ammonia adsorption amount is maintained near the idle regeneration target adsorption amount Qnti.

If the engine speed becomes the idling upper limit speed REi or less during the idle regeneration mode, the idle regeneration processing is executed. However, in the example shown in FIG. 8, the engine speed RE does not become the idling upper limit speed REi or less in the idle regeneration limit time frame $\Delta t_2$ from the time $t_1$. For this reason, during this time frame, idle regeneration processing is not executed. At the time $t_2$, the regeneration mode is switched from the idle regeneration mode to the forced regeneration mode.

If, at the time $t_2$, the forced regeneration mode is entered, the ammonia target adsorption amount Qnt in the $NO_X$ selective reduction catalyst 28 is decreased from the idle regeneration target adsorption amount Qnti to the forced regeneration target adsorption amount Qntf. Along with this, the actual ammonia adsorption amount is decreased to near the forced regeneration target adsorption amount Qntf. If, at the time $t_3$, the actual ammonia adsorption amount is decreased to near the forced regeneration target adsorption amount Qntf, the forced regeneration processing is executed. As a result, PM which has built up at the particulate filter 26 is removed and the $NO_X$ selective reduction catalyst discharges a predetermined limit value or less of ammonia.

Fourth Embodiment

Next, referring to FIG. 9, a fourth embodiment of the present disclosure will be explained. The configuration and control of the exhaust purification system of an internal combustion engine in the fourth embodiment are basically similar to the configuration and control of the exhaust purification system in the first embodiment. However, in the exhaust purification system of the fourth embodiment, the forced regeneration mode is not entered and accordingly forced regeneration processing is not performed.

That is, in the exhaust purification system of the fourth embodiment, when regeneration of the particulate filter 26 is demanded, first, the stop regeneration mode is entered. Further, when the stop regeneration processing has not been performed in a predetermined stop regeneration limit time frame from the start of the stop regeneration mode, the regeneration mode is switched from the stop regeneration mode to the idle regeneration mode. After that, the regeneration mode is maintained at the idle regeneration mode until the execution start condition of the idle regeneration processing stands, that is, the engine speed RE becomes the idling upper limit speed REi or less.

Figure 9:
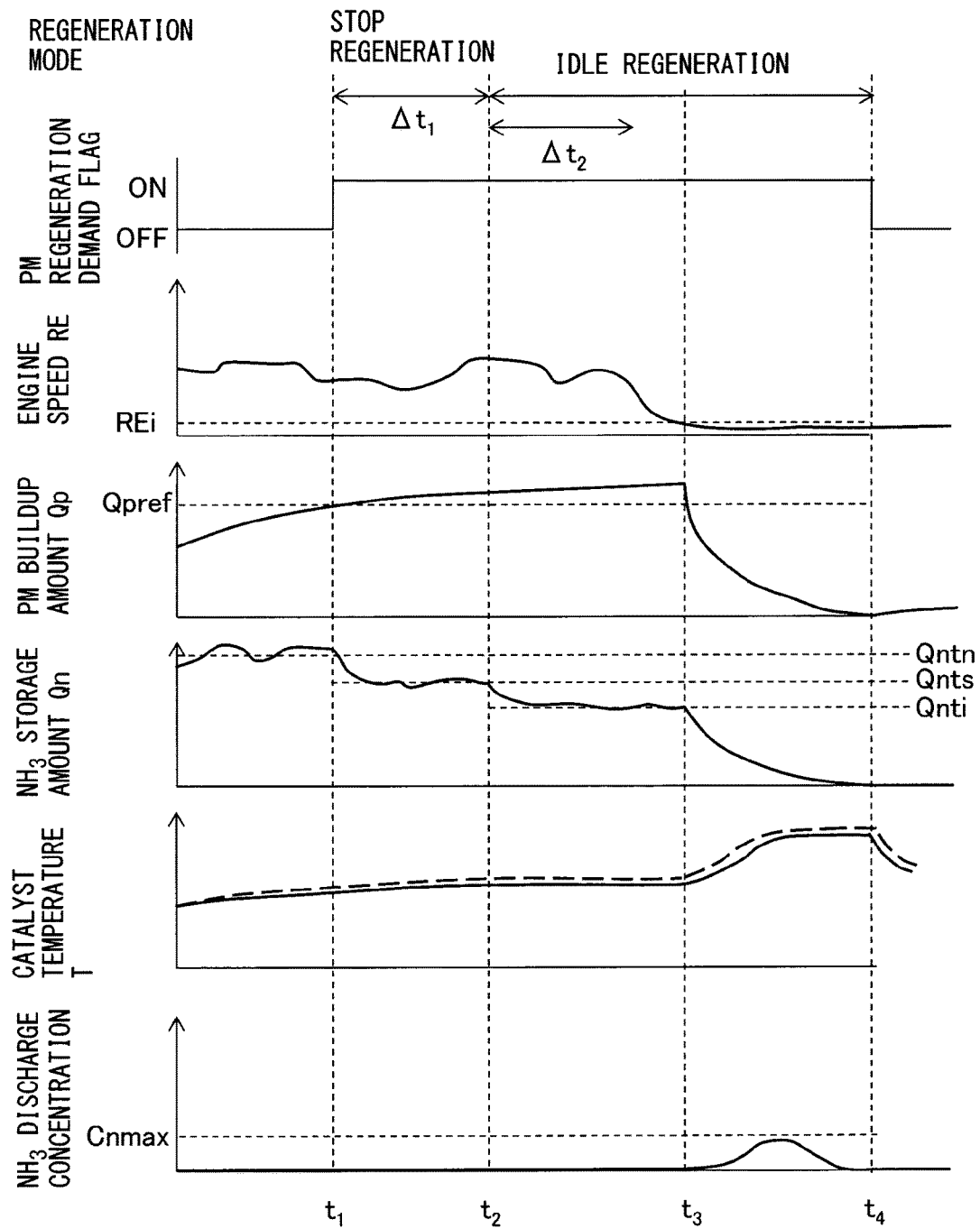
FIG. 9 is a time chart of engine speed, etc., when performing filter regeneration control in a fourth embodiment.

FIG. 9 is a time chart similar to FIG. 3 when performing the filter regeneration control in the fourth embodiment. In the example shown in FIG. 9, up to the time $t_2$, the parameters follow similar trends as in the example shown in FIG. 3. In addition, at the time $t_2$, that is, after the elapse of the stop regeneration limit time frame $\Delta t_1$ from the start of the stop regeneration mode, the regeneration mode is switched from the stop regeneration mode to the idle regeneration mode.

If, at the time $t_2$, the idle regeneration mode is performed, the ammonia target adsorption amount Qnt in the $NO_X$ selective reduction catalyst 28 is decreased from the stop regeneration target adsorption amount Qnts to the idle regeneration target adsorption amount Qnti. Along with this, the actual ammonia adsorption amount is maintained near the idle regeneration target adsorption amount Qnti.

After that, in the example shown in FIG. 9, in the above-mentioned idle regeneration limit time frame $\Delta t_2$ from the time $t_2$, the engine speed RE does not fall to the idling upper limit speed REi or less, and accordingly the idle regeneration processing is not performed. However, in the present embodiment, even if the idle regeneration processing is not performed in the idle regeneration limit time frame $\Delta t_2$, the idle regeneration mode is continued. That is, in the present embodiment, the idle regeneration mode is continued until the idle regeneration processing is performed.

In the example shown in FIG. 9, at the time $t_3$ after the elapse of the idle regeneration limit time frame $\Delta t_2$ from the time $t_2$, the engine speed RE becomes the upper limit speed REi or less. Accordingly, at the time $t_3$, the idle regeneration processing is performed. Therefore, the particulate filter 26 is heated by the electric heater 27 and fuel is added to the exhaust gas by the fuel addition valve 33. Due to this, the temperature of the particulate filter 26 can be risen to the PM regeneration temperature and the PM which has built up on the particulate filter 26 can be removed.

Fifth Embodiment

Next, referring to FIG. 10, a fifth embodiment of the present disclosure will be explained. The configuration and control of the exhaust purification system of an internal combustion engine in the fifth embodiment are basically similar to the configuration and control of the above exhaust purification system. However, in the exhaust purification system of the fifth embodiment, sometimes the ammonia target adsorption amount in each regeneration mode changes in accordance with the temperature of the $NO_X$ selective reduction catalyst 28.

In the above embodiments, the normal target adsorption amount Qntn sometimes changes in accordance with the temperature of the $NO_X$ selective reduction catalyst 28. However, even in this case, the normal target adsorption amount Qntn is always set to an amount greater than the stop regeneration target adsorption amount Qnts. As opposed to this, in the present embodiment, as shown in FIG. 10, the normal target adsorption amount Qntn is set, according to the temperature of the $NO_X$ selective reduction catalyst 28, to become smaller than the stop regeneration target adsorption amount Qnts, idle regeneration target adsorption amount Qnti, and forced regeneration target adsorption amount Qntf.

Figure 10:
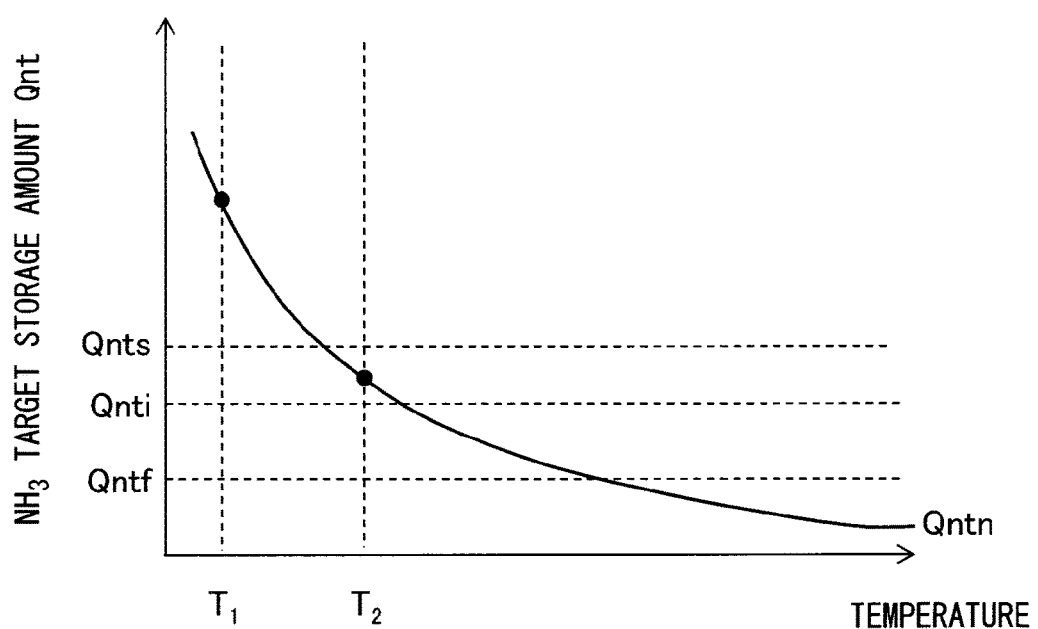
FIG. 10 is a view which shows the relationship between a temperature of an $NO_X$ selective reduction catalyst and an ammonia target adsorption amount.

FIG. 10 is a view which shows the relationship of the temperature of the $NO_X$ selective reduction catalyst 28 and the ammonia target adsorption amount Qnt. As shown in FIG. 10, the normal target adsorption amount Qntn is set smaller the higher the temperature of the $NO_X$ selective reduction catalyst 28 becomes. As a result, if the temperature of the $NO_X$ selective reduction catalyst 28 becomes a certain temperature or more, the normal target adsorption amount Qntn becomes smaller than the stop regeneration target adsorption amount Qnts, idle regeneration target adsorption amount Qnti, and forced regeneration target adsorption amount Qntf.

In this regard, in the present embodiment, where the normal target adsorption amount Qntn is set in this way, when the ammonia target adsorption amount in the mode to be executed is greater than the normal target adsorption amount Qntn, the ammonia target adsorption amount is set to the normal target adsorption amount Qntn. For example, if the temperature of the $NO_X$ selective reduction catalyst 28 is the $T_2$ of FIG. 10, the stop regeneration target adsorption amount Qnts is larger than the normal target adsorption amount Qntn. Therefore, when the temperature of the $NO_X$ selective reduction catalyst 28 is $T_2$, at the stop regeneration mode, the ammonia target adsorption amount is set to the normal target adsorption amount Qntn. On the other hand, if the temperature of the $NO_X$ selective reduction catalyst 28 is $T_1$ of FIG. 10, the stop regeneration target adsorption amount Qnts is smaller than the normal target adsorption amount Qntn. Therefore, when the temperature of the $NO_X$ selective reduction catalyst 28 is $T_1$, at the stop regeneration mode, the ammonia target adsorption amount is set to the stop regeneration target adsorption amount Qnts.

REFERENCE NOTATIONS LIST

1. engine body
2. combustion chamber
3. fuel injector
4. intake manifold
5. exhaust manifold
20. exhaust purification system
22. upstream side casing
24. downstream side casing
25. three-way catalyst
26. particulate filter
27. electric heater
28. $NO_X$ selective reduction catalyst
29. three-way catalyst
32. addition control valve
33. fuel addition valve
34. secondary air feed device
40. ECU

The invention claimed is:

1. An exhaust purification system of an internal combustion engine, comprising:
    a particulate filter which is provided in an engine exhaust passage;
    a selective reduction catalyst which is provided in the engine exhaust passage at a downstream side from said particulate filter in a direction of exhaust flow;
    an ammonia ingredient feed device which feeds an ammonia ingredient to said selective reduction catalyst;
    a control device which controls the amount of feed of ammonia ingredient from said ammonia ingredient feed device so that the amount of the ammonia ingredient which is adsorbed at said selective reduction catalyst becomes a target adsorption amount; and
    a filter regeneration system which performs filter regeneration processing to remove PM which has built up on said particulate filter, when an execution start condition of the filter regeneration processing stands,
    wherein when removal of PM which has built up on said particulate filter is demanded, so long as the execution start condition of the filter regeneration processing by said filter regeneration system does not stand, said target adsorption amount is decreased a plurality of times in stages, and
    said execution start condition of the filter regeneration processing is changed to a different condition at each stage of said target adsorption amount.

2. The exhaust purification system of an internal combustion engine according to claim 1, wherein the execution start condition of the filter regeneration processing is set to a condition with a higher frequency of standing as said target adsorption amount is decreased in stages.

3. The exhaust purification system of an internal combustion engine according to claim 2, wherein each execution start condition of said filter regeneration processing stands when the engine speed is a respective predetermined speed or less; and
    wherein said predetermined speed is set to a higher speed as said target adsorption amount is decreased in stages.

4. The exhaust purification system of an internal combustion engine according to claim 1, wherein said target adsorption amount is again decreased if a cumulative value of amount of discharge of $NO_X$ reaches a predetermined amount after said target adsorption amount is decreased a previous time.

5. The exhaust purification system of an internal combustion engine according to claim 1, wherein said filter regeneration system has a plurality of filter regenerating processes for removing PM which has built up on said particulate filter; and
    wherein at each stage of said target adsorption amount, when said execution start condition of the filter regeneration processing stands, a filter regenerating process which partially differs for each stage of said target adsorption amount is used to remove PM which has built up on said particulate filter.

6. The exhaust purification system of an internal combustion engine according to claim 1, wherein said filter regeneration system has a plurality of filter regenerating processes for removing PM which has built up on said particulate filter;

when removal of PM which has built up on said particulate filter is demanded, so long as the execution start condition of the filter regeneration processing by said filter regeneration system does not stand, as a first stage, said target adsorption amount is set to a first adsorption amount and as a second stage, said target adsorption amount is set to a second adsorption amount smaller than said first adsorption amount;

when said target adsorption amount is set to said first adsorption amount, said execution start condition of the filter regeneration processing is set to a first condition, and when said target adsorption amount is set to said first adsorption amount and said execution start condition of the filter regeneration processing stands, PM which has built up on said particulate filter is removed by a first filter regenerating process; and when said target adsorption amount is set to second adsorption amount, said execution start condition of the filter regeneration processing is set to a second condition with a higher frequency of standing than said first condition, and when said target adsorption amount is set to said second adsorption amount and said execution start condition of the filter regeneration processing stands, said particulate filter is risen in temperature by a second filter regenerating process which is at least partially different from said first filter regenerating process.

7. The exhaust purification system of an internal combustion engine according to claim 6, wherein at the time of normal operation when removal of PM which has built up on said particulate filter is not demanded, said target adsorption amount is set to a normal target adsorption amount which is set based on an operation parameter of the internal combustion engine;

when removal of PM which has built up on said particulate filter is demanded, if said first adsorption amount is larger than said normal target adsorption amount, at said first stage, said target adsorption amount is set to said normal target adsorption amount instead of said first adsorption amount; and when removal of PM which has built up on said particulate filter is demanded, if said second adsorption amount is greater than said normal target adsorption amount, at said second stage, said target adsorption amount is set to said normal target adsorption amount instead of said second adsorption amount.

8. The exhaust purification system of an internal combustion engine according to claim 6, further comprising: a heater which heats said particulate filter by electric power; a secondary air feed device which feeds secondary air to said particulate filter; and a fuel addition valve which feeds fuel to said particulate filter, wherein said first condition stands when the engine speed becomes zero;

said first filter regenerating process makes the particulate filter rise in temperature by said heater and feeds secondary air from said secondary air feed device when removing PM which has built up on said particulate filter; and said second filter regenerating process feeds fuel from said fuel addition valve to said particulate filter when removing PM which has built up on said particulate filter.

9. The exhaust purification system of an internal combustion engine according to claim 6, further comprising:

a heater which heats said particulate filter by electric power; and a fuel addition valve which feeds fuel to said particulate filter, wherein said first condition stands when the engine speed is equal to or less than a predetermined idling upper limit speed, which is higher than zero;

said first filter regenerating process makes the particulate filter rise in temperature by said heater and feeds fuel from said fuel addition valve to said particulate filter when removing PM which has built up on said particulate filter; and said second filter regenerating process does not use said heater to make the particulate filter rise in temperature but feeds fuel from said fuel addition valve to said particulate filter when removing PM which has built up on said particulate filter.

10. The exhaust purification system of an internal combustion engine according to claim 6, further comprising: a heater which heats said particulate filter by electric power; a secondary air feed device which feeds secondary air to said particulate filter; and a fuel addition valve which feeds fuel to said particulate filter, wherein said first condition stands when the engine speed becomes zero, while said second condition stands when the engine speed is equal to or less than a predetermined idling upper limit speed, which is higher than zero, said first filter regenerating process makes the particulate filter rise in temperature by the heater and feeds secondary air from said secondary air feed device when removing PM which has built up on said particulate filter, and said second filter regenerating process makes the particulate filter rise in temperature by said heater and feeds fuel from said fuel addition valve to said particulate filter when removing PM which has built up on said particulate filter.

11. The exhaust purification system of an internal combustion engine according to claim 6 wherein when removal of PM which has built up on said particulate filter is demanded, so long as the filter regeneration processing by said filter regeneration system is not started, as a third stage, said target adsorption amount is set to a third adsorption amount which is smaller than said second adsorption amount; and when said target adsorption amount is set to said third adsorption amount, said execution start condition of the filter regeneration processing is set to a third condition with a higher frequency of standing than said second condition, and when said target adsorption amount is set to said third adsorption amount and said execution start condition of the filter regeneration processing stands, PM which has built up on said particulate filter is removed by a third filter regenerating process which is at least partially different from said first filter regenerating process and said second filter regenerating process.

12. The exhaust purification system of an internal combustion engine according to claim 11, further comprising: a heater which heats said particulate filter by electric power; a secondary air feed device which feeds secondary air to said particulate filter, and a fuel addition valve which feeds fuel to said particulate filter, wherein said first condition stands when the engine speed becomes zero while said second condition stands when the engine speed is equal to or less than a predetermined idling upper limit speed, which is higher than zero;

said first filter regenerating process makes the particulate filter rise in temperature by said heater and feeds secondary air from said secondary air feed device when removing PM which has built up on said particulate filter;

said second filter regenerating process makes the particulate filter rise in temperature by said heater and feeds fuel from said fuel addition valve to said particulate filter when removing PM which has built up on said particulate filter; and said third filter regenerating process does not use said heater to raise the temperature of the particulate filter but feeds fuel from said fuel addition valve to said particulate filter when removing PM which has built up on said particulate filter.

* * * * *

UNITED STATES PATENT AND TRADEMARK OFFICE
CERTIFICATE OF CORRECTION

PATENT NO. : 10,138,778 B2
APPLICATION NO. : 15/313805
DATED : November 27, 2018
INVENTOR(S) : Hiromasa Nishioka et al.

It is certified that error appears in the above-identified patent and that said Letters Patent is hereby corrected as shown below:

In the Claims

In Column 26, Claim 11, Line 49, delete "claim 6" and insert --claim 6,--, therefor.

Signed and Sealed this
Fifth Day of March, 2019

Andrei Iancu
*Director of the United States Patent and Trademark Office*